US005442912A

United States Patent [19]

Hirata et al.

[11] Patent Number: 5,442,912

[45] Date of Patent: Aug. 22, 1995

[54] HYDRAULIC RECOVERY DEVICE

[75] Inventors: Toichi Hirata, Ushiku; Genroku Sugiyama, Ibaraki; Masami Ochiai, Atsugi, all of Japan

[73] Assignee: Hitachi Construction Machinery Co., Ltd., Tokyo, Japan

[21] Appl. No.: 256,557

[22] PCT Filed: Dec. 3, 1993

[86] PCT No.: PCT/JP93/01763

§ 371 Date: Jul. 11, 1994

§ 102(e) Date: Jul. 11, 1994

[87] PCT Pub. No.: WO94/13959

PCT Pub. Date: Jun. 23, 1994

[30] Foreign Application Priority Data

Dec. 4, 1992 [JP] Japan .................................. 4-325612

[51] Int. Cl.[6] ......................... F16D 31/02; F15B 11/16

[52] U.S. Cl. ......................................... 60/426; 60/468; 60/494; 91/517; 91/518; 91/461

[58] Field of Search ................. 60/420, 426, 468, 494; 91/511, 512, 518, 517, 461

[56] References Cited

U.S. PATENT DOCUMENTS

| | | | |
|---|---|---|---|
| 4,845,947 | 7/1989 | Persson et al. | 60/494 X |
| 4,901,812 | 2/1990 | Ferguson | 60/468 X |
| 4,967,557 | 11/1990 | Izumi et al. | 60/426 X |
| 5,046,309 | 9/1991 | Yoshino | 91/461 X |
| 5,129,230 | 7/1992 | Izumi et al. | 60/468 X |
| 5,168,705 | 12/1992 | Hirata et al. . | |

FOREIGN PATENT DOCUMENTS

| | | |
|---|---|---|
| 5668800 | 10/1979 | Japan . |
| 59-194102 | 11/1984 | Japan . |
| 61-204006 | 12/1986 | Japan . |
| 62-46801 | 3/1987 | Japan . |
| 2-47252 | 3/1990 | Japan . |
| 2-89050 | 7/1990 | Japan . |
| 3-12004 | 2/1991 | Japan . |
| 4-57881 | 9/1992 | Japan . |

*Primary Examiner*—Edward K. Look
*Assistant Examiner*—Hoang Nguyen
*Attorney, Agent, or Firm*—Fay, Sharpe, Beall, Fagan, Minnich & McKee

[57] ABSTRACT

A hydraulic recovery device in a hydraulic system having a pump (1) driving a plurality of actuators through a plurality of control valves (2, 3), the hydraulic recovery device comprising a variable resistance valve (6, 60) in a first line being controlled by a control signal (Px), a third line, a check valve (7) disposed in the third line for allowing the hydraulic fluid to flow only in a direction from the first line toward the second line. The hydraulic recovery device further comprises (a) detecting apparatus (101; 106; 102*a*, 102*b*; 103*a*, 103*b*) *for detecting a condition variable (Pd; Ph; Pia*1, Pia2; Pib1, Pib2) related to an operation of the actuator (4); (b) control apparatus (100; 100A–100H) for receiving a signal from the detecting apparatus and producing a drive signal (i; i*) corresponding to the condition variable based on a relationship stored therein in advance; and (c) control signal generating apparatus (105) for receiving the drive signal and producing the control signal (Px) corresponding to the drive signal, whereby the device can optionally set a characteristic of the variable resistance valve and can avoid abrupt changes in a recovered flow rate.

17 Claims, 22 Drawing Sheets

COMPARATIVE EXAMPLE

HYDRAULIC RECOVERY DEVICE

TECHNICAL FIELD

The present invention relates to a hydraulic recovery device with which, when driving working members such as a boom, arm and bucket of a hydraulic excavator, for example, hydraulic force of a hydraulic fluid returned from a hydraulic actuator to a reservoir is reused to increase a speed of the working member, and more particularly to a hydraulic recovery device with which hydraulic force can be efficiently reused even upon, e.g., abrupt variations in pressure.

BACKGROUND ART

One of prior art hydraulic recovery devices equipped in hydraulic drive systems is described in JP-B-4-57881, for example. This hydraulic recovery device is equipped in a hydraulic drive system comprising a plurality of actuators operated by a hydraulic fluid supplied from a variable displacement type hydraulic pump, and a plurality of directional control valves disposed between the hydraulic pump and the plurality of actuators for controlling respective flows of the hydraulic fluid supplied to the associated actuators. The hydraulic recovery device comprises variadisposed in a first line communicating a reservoir port of at least one of the plurality of directional control valves and a reservoir, a third line communicating a portion of the first line upstream of the recovery control valve and a second line connected to a pump port of the directional control valve, and a check valve disposed in the third line for allowing-the hydraulic fluid to flow only in a direction from the first line toward the second line.

The recovery control valve comprises a spool formed with a variable throttle, a hydraulic driving sector to which the pressure in the second line is introduced as a condition variable related to the operation of a hydraulic cylinder for driving the spool in the valve opening direction, and a set spring for urging the spool in the valve closing direction. An opening area (an amount of restriction) of the variable throttle is set at the position where the pressure introduced to the hydraulic driving sector and the urging force of the set spring are balanced.

When the directional control valve is operated in a direction to extend a rod of the hydraulic cylinder as the associated actuator, the hydraulic fluid from the hydraulic pump is introduced to a bottom side hydraulic chamber of the hydraulic cylinder via the first line and the directional control valve. On the other hand, the hydraulic fluid delivered from a rod side hydraulic chamber with the operation of the hydraulic cylinder flows into the directional control valve and is then introduced to the reservoir via the first line and the variable throttle of the recovery control valve. At this time, while the load of the hydraulic cylinder is small and pressing force due to the pressure in the second line introduced to the hydraulic driving sector of the recovery control valve is smaller than the pressing force of the set spring, the variable throttle is held at its closed or throttled position and, therefore, a pressure corresponding to the amount of restriction is generated in the first line. At the time the pressure so generated in the first line exceeds the pressure in the second line, a part of the return fluid flowing out of the directional control valve to the first line is allowed to pass into the second line via the third line and the check valve for recovery, and is then supplied to the directional control valve after joining with the hydraulic fluid from the hydraulic pump. Thus, the flow rate of the hydraulic fluid supplied to the bottom side hydraulic chamber of the hydraulic cylinder is increased by an amount corresponding to the recovered flow rate introduced from the first line, thereby increasing a moving speed of the hydraulic cylinder accordingly.

On the other hand, when the load of the hydraulic cylinder is increased and the pressure in the bottom side hydraulic chamber is raised, the delivery pressure of the hydraulic pump is raised and so is the pressure in the second line introduced to the hydraulic driving sector of the recovery control valve. Therefore, the spool of the direction and the pressure in the first line is so reduced that the pressure in the second line becomes higher than the pressure in the first line. As a result, the check valve is held closed and driving force of the hydraulic cylinder is ensured against the large load.

In short, with the above-described prior art, when the load of the hydraulic cylinder is small, at least a part of the hydraulic fluid returned from the hydraulic cylinder to the reservoir is recovered and used for driving the hydraulic cylinder, whereby the moving speed of the hydraulic cylinder is increased and hence the working efficiency is improved. When the load of the hydraulic cylinder is increased, driving force of the hydraulic cylinder is also increased, enabling the load to be surely driven.

Another example of prior art hydraulic recovery devices is described in U.S. Pat. No. 5,168,705. This hydraulic recovery device is designed to employ a shift amount of the directional control valve as a condition variable related to the operation of the hydraulic cylinder, and to change an opening area of the variable throttle of the recovery control valve in link with the shift amount of the directional control valve. More specifically, the variable throttle of the recovery control valve is formed on the same spool as that of the directional control valve on which meter-in and meter-out variable throttles are formed. When the directional control valve is finely operated, the opening area of the variable throttle of the recovery control valve is small as with the meter-in and meter-out variable throttles of the directional control valve, the pressure in the first line is so raised that a part of the hydraulic fluid can be recovered without causing a cavitation. When the shift amount of the directional control valve is increased, the opening area of the variable throttle of the recovery control valve becomes larger as with the meter-in and meter-out variable throttles of the directional control valve, the pressure in the first line is lowered and driving force of the hydraulic cylinder is ensured against the large load.

DISCLOSURE OF THE INVENTION

In the prior art devices described above, however, the condition variable (the pressure in the second line or the shift amount of the directional control valve) related to the operation of the hydraulic cylinder is directly applied to act on the recovery control valve for controlling the variable throttle of the recovery control valve. This raises the following problems.

In the hydraulic recovery device described in the above-cited JP-B-4-57881, because the recovery control valve generally used has a small size, the set spring disposed in the recovery control valve is obliged to have a short length and a small spring diameter. This results in a small spring constant and a steep displacement characteristic of the spool with respect to the delivery pressure of the hydraulic pump (the pressure in the second line). the hydraulic pump (the pressure in the second line). Therefore, even with slight variations in the delivery pressure of the hydraulic pump (the pressure in the second line), the flow rate of the hydraulic fluid passing through the variable throttle is abruptly changed.

Consequently, the following problems are caused:

(1) If the delivery pressure of the hydraulic pump is only slightly varied when the hydraulic cylinder is operated to extend its rod, the recovered flow rate from the first line to the second line is abruptly changed and the moving speed of the hydraulic cylinder is quickly changed. As a result, operability is much deteriorated; and (2) If the delivery pressure of the hydraulic pump is only slightly varied, an outflow rate through the variable throttle of the recovery control valve is abruptly changed and hence pressure variations in the first line and the second line are increased, which gives rise to a fear of causing a hunting.

In the prior art described in the above-cited U.S. Pat. No. 5,168,705, because the variable throttle of the recovery control valve is formed on the same spool as that of the directional control valve on which meter-in and meter-out variable throttles are formed, a flow rate characteristic of the variable throttle of the recovery control valve with respect to the shift amount of the directional control valve is so steep that the recovered flow rate is abruptly changed even with slight changes in the shift amount. Accordingly, as with the above-described prior art, the problems are also encountered in, e.g., deterioration of operability due to quick change in the moving speed of the hydraulic cylinder and a fear of causing a hunting.

Furthermore, in order that the variable throttle of the recovery control valve has a gentle flow rate characteristic with respect to the delivery pressure of the hydraulic pump or the shift amount of the directional control valve, a spool land defining the variable throttle is required to be machined with very high accuracy, raising another technical problem.

An object of the present invention is to provide a hydraulic recovery device which can optionally set a characteristic of variable resistance means and can avoid abrupt changes in a recovered flow rate.

To achieve the above object, according to the present invention, there is provided a hydraulic recovery device equipped in a hydraulic drive system comprising a plurality of actuators operated by a hydraulic fluid supplied from a variable displacement type hydraulic pump, and a plurality of directional control valves disposed between said hydraulic pump and said plurality of actuators for controlling respective flows of the hydraulic fluid supplied to the associated actuators, said hydraulic recovery device comprising variable resistance means disposed in a first line communicating a reservoir port of at least one of said plurality of directional control valves and a reservoir for controlling a flow rate passing from said reservoir port to line communicating a portion of said first line upstream of said variable resistance means and a second line connected to a pump port of said one directional control valve, and a check valve disposed in said third line for allowing the hydraulic fluid to flow only in a direction from said first line toward said second line, wherein said hydraulic recovery device further comprises (a) detecting means for detecting a condition variable related to an operation of said actuator; (b) control means for receiving a signal from said detecting means and producing a drive signal corresponding to said condition variable based on a relationship stored therein in advance; and (c) control signal generating means for receiving said drive signal and producing said control signal corresponding to said drive signal.

In the above hydraulic recovery device, said condition variable may be a pressure that is changed with an operation of said actuator associated with said directional control valve. In this case, said relationship stored in advance sets a relationship between said pressure and said drive signal such that a change in an outflow rate through said variable resistance means per unit variation in said pressure as said condition variable becomes smaller than would be the case of directly driving said variable resistance means with said pressure. Alternatively, the pressure as said condition variable may be a delivery pressure of said hydraulic pump or a load pressure of said actuator associated with said directional control valve.

In the above hydraulic recovery device, said condition variable may be an operating signal applied to said directional control valve for instructing an operation of the associated actuator. In this case, said relationship stored in advance sets a relationship between said operating signal and said drive signal such that a pressure change caused in said second line by said variable resistance means per unit variation in said operating signal as said condition variable becomes smaller than would be the case of directly driving said variable resistance means with said operating signal. When said directional control valve is a pilot-operated valve, the operating signal as said condition variable may be a pilot pressure applied to said directional control valve.

In the above hydraulic recovery device, said condition variable may comprise a pressure that is changed with an operation of said actuator associated with said directional control valve and an operating signal applied to said directional control valve for instructing an operation of the associated actuator. In this case, said control means includes means for combining said pressure and said operating signal to produce said drive signal.

Also, said condition variable may comprise an operating signal applied to said directional control valve for instructing an operation of the associated actuator and an operating signal applied to the other directional control valve for instructing an operation of the associated actuator. In this case, said control means includes means for combining said two operating signals to produce said drive signal.

Further, said condition variable may comprise a pressure that is changed with an operation of said actuator associated with said directional control valve, an operating signal applied to said directional control valve for instructing an operation of the associated actuator and an operating signal applied to the other directional control valve for instructing an operation of the associated actuator. In this case, said control means includes means for combining said pressure and said two operating signals to produce said drive signal.

Preferably, the above hydraulic recovery device further comprises mode switch means for outputting a mode signal to said control means, and said control means includes storage means for storing, as said relationship stored in advance, a plurality of relationships between said condition variables and said drive signal, and select means for producing said drive signal based on one of said plurality of relationships in response to said mode signal.

Preferably, the above hydraulic recovery device further comprises recovery select switch means for outputting a select signal to said control means, and said control means includes switching means for switching the output of said drive signal in response to said select signal.

In the above hydraulic recovery device, preferably, said variable resistance means is valve means having a variable throttle. Said variable resistance means may be a variable relief valve.

Also, said control signal generating means is preferably a solenoid proportional valve for generating a pilot pressure.

Preferably, the above hydraulic recovery device further comprises a low-pass filter disposed between said detecting means and said control means for removing low-frequency components of the signal from said detecting means.

The operation of the present invention arranged as above will now be described.

When the directional control valve is operated in the hydraulic drive system according to the present invention, the hydraulic fluid is supplied to the actuator associated with the directional control valve. Also, the hydraulic fluid drained from the actuator is introduced to the variable resistance means via the reservoir port of the directional control valve and the first line. As the flow rate introduced to the variable resistance means increases, the pressure in the first line is raised. When the pressure in the first line exceeds the pressure in the first line, the check valve is pushed to open, allowing the hydraulic fluid to flow, as a recovered flow rate, from the first line to the second line via the third line, whereby the moving speed of the actuator is increased.

On the other hand, the condition variable related to the operation of the actuator is changed from time to time. Such a change in the condition variable is detected by the detecting means and is input to the control means. The control means produces the drive signal corresponding to the condition variable based on the relationship stored in advance, and outputs it to the control signal generating means. The control signal generating means produces the control signal corresponding to the drive signal, the control signal being output to the variable resistance means. In accordance with the control signal, the variable resistance means controls the flow rate passing into the reservoir via the first line.

The relationship stored in advance in the control means can be optionally set and, therefore, a characteristic of the variable resistance means can also be optionally set. Accordingly, when the pressure changed with the operation of the actuator associated with the directional control valve, e.g., the delivery pressure of the hydraulic pump, is used as the condition variable, the relationship stored in advance can be set to provide a relationship between the above pressure and the drive signal such that a change in the outflow rate through the variable resistance means per unit variation in the pressure as the condition variable becomes smaller than would be the case of directly driving the variable resistance means with the above pressure. By so setting the relationship, the recovered flow rate is less changed.

As an alternative, when the operating signal applied to the directional control valve for instructing the operation of the associated actuator is used as the condition variable, the relationship stored in advance can be set to provide a relationship between the operating signal and the drive signal such that a change caused in the second line by the variable resistance means per unit variation in the operating signal as the condition variable becomes smaller than would be the case of directly driving the variable resistance means with-the operating signal. By so setting the relationship, the recovered flow rate is more gently changed.

Thus, the present invention makes it possible to optionally set a characteristic of the variable resistance means and to avoid abrupt changes in the recovered flow rate.

BEST MODE FOR CARRYING OUT THE INVENTION

Hereinafter, embodiments of the present invention will be described with reference to the drawings. It should be noted that, in the following embodiments, the invention is applied to a hydraulic circuit for a hydraulic excavator not shown.

First Embodiment

A first embodiment of the present invention will be described with reference to FIG. 1 to 15.

Figure 1:
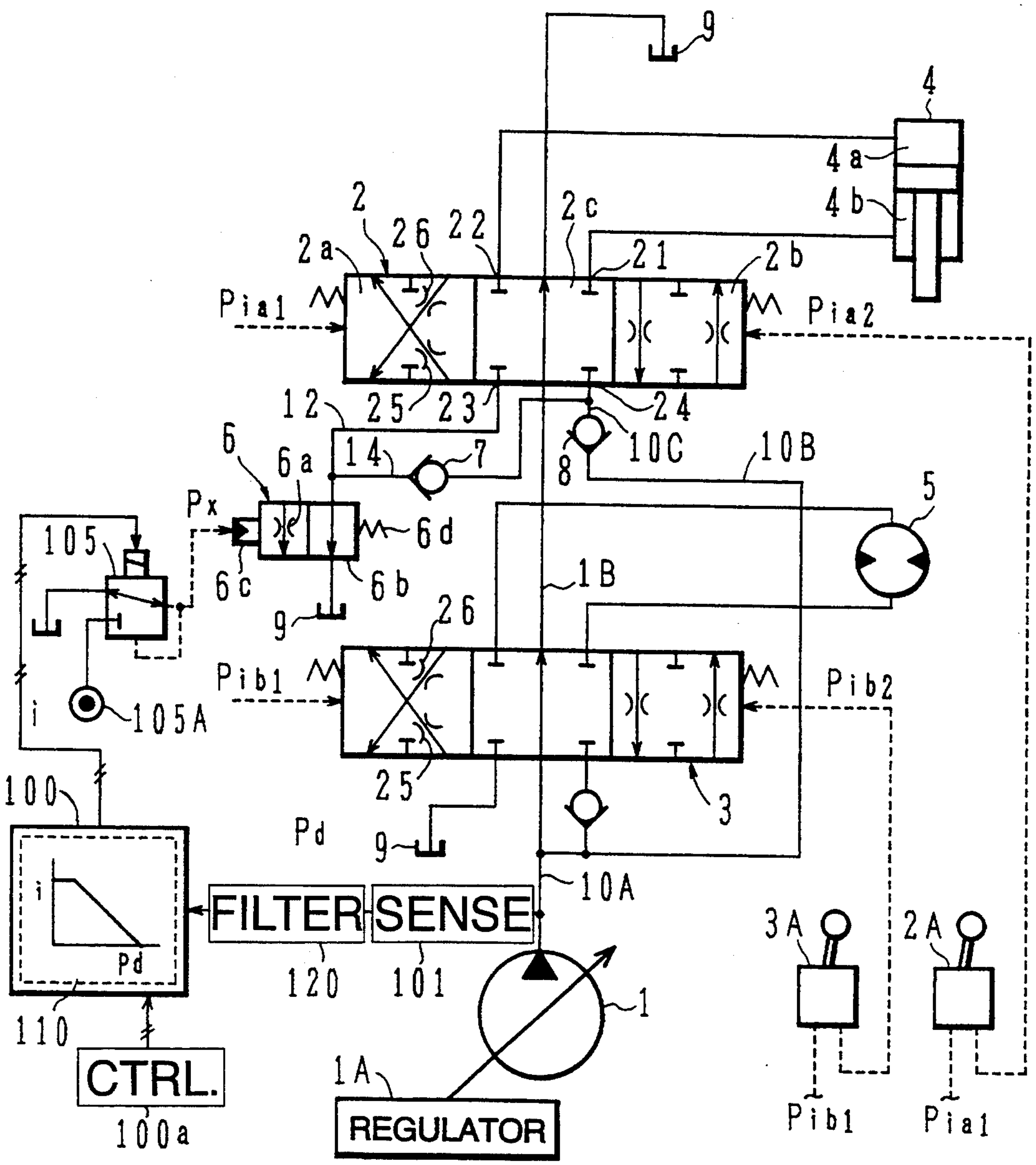
FIG. 1 is a diagram showing the entire arrangement of a hydraulic drive system equipped with a hydraulic recovery device according to a first embodiment of the present invention.

In FIG. 1, a hydraulic drive system for a hydraulic excavator comprises a variable displacement type hydraulic pump 1 of which displacement volume is controlled by a regulator 1A, a plurality of actuators 4, 5 operated by a hydraulic fluid delivered from the hydraulic pump 1, and a plurality of directional control valves 3, 4 disposed respectively between the hydraulic pump 1 and the plurality of actuators 4, 5 for controlling respective flows of the hydraulic fluid supplied to the associated actuators.

For example, the actuator 4 is a hydraulic cylinder for driving an arm (not shown) of the hydraulic excavator and the actuator 5 is a hydraulic motor for driving a swing (not shown) of the hydraulic excavator.

The directional control valves 3, 4 are center bypass type valves through which a center bypass line 1B communicating the hydraulic pump 1 and a reservoir 9 is penetrating, and are connected in parallel to each other via a delivery line 10A and a pump line 10B of the hydraulic pump 1. The directional control valves 2, 3 are operated with pilot pressures Pia1, Pia2 and Pib1, Pib2 generated respectively by control lever units 2A, 3B, and each include a meter-in variable throttle 25 and a meter-out variable throttle 26 of which amounts of restriction are set depending on the amount of movement of a spool.

The directional control valve 2 has a reservoir port 23 connected to the reservoir 9 via a first line 12 as a drain line, and a pump port 24 connected to the pump line 10B via a second line 10C as a feeder line. A check valve 8 for preventing the hydraulic fluid from flowing reversely from the pump port 24 to the pump line 10B is disposed in the second line 10C. Counterparts associated with the directional control valve 3 are arranged similarly.

A hydraulic recovery device of this embodiment is equipped in the hydraulic drive system constructed as above. The hydraulic recovery device comprises a recovery control valve 6 as pressure generating means disposed in the first line 12, a third line 14 communicating a portion of the first line 12 upstream of the recovery control valve 6 and the second line 10C for the purpose of recovery, and a check valve 7 disposed in the third line 14 for allowing the hydraulic fluid to flow only in a direction from the first line 12 toward the second line 10C.

The recovery control valve 6 comprises a spool *6b* formed with a variable throttle *6a*, a hydraulic driving sector *6c* to which a pilot pressure Px is introduced for driving the spool *6b* in the valve closing direction, and a set spring *6d* for urging the spool *6b* in the valve opening direction. An opening area (an amount of restriction) of the variable throttle *6a* is set at the position where the pilot pressure introduced to the hydraulic driving sector *6c* and the urging force of the set spring *6d* are balanced.

The hydraulic recovery device of this embodiment further comprises detecting means, e.g., a pressure sensor 101, for detecting a delivery pressure Pd of the hydraulic pump 1 as a condition variable related to the operation of pump 1 as a conditions variable related to the operation of the hydraulic cylinder 4, a low-pass filter 120 for removing pulsations in the delivery pressure Pd of the hydraulic pump 1 occurred upon start and stop of the operation, pressure instructing means for generating a pilot pressure Px introduced to the hydraulic driving sector *6c* of the recovery control valve 6 to thereby drive the spool *6b*, e.g., a solenoid proportional valve 105 for generating a secondary pressure corresponding to a drive signal i, as the pilot pressure Px, based on a pilot primary pressure from a hydraulic source 105A, and a controller 100 for receiving the delivery pressure Pd of the hydraulic pump 1, given as a detection value of the pressure sensor 101, via the filter 120, generating the drive signal i corresponding to the pump delivery pressure, and then outputting it to the solenoid proportional valve 105.

Figure 2:
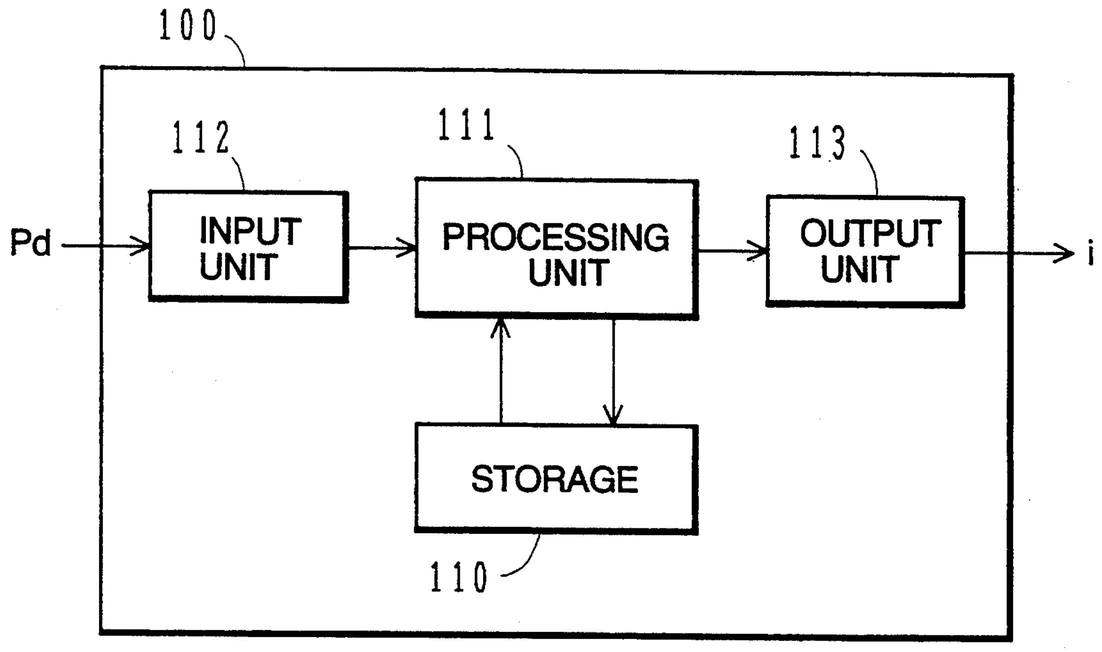
FIG. 2 is a block diagram showing the arrangement of a controller in the first embodiment.

The controller 100 comprises, as shown in FIG. 2, an input unit 112 for receiving the delivery pressure Pd of the hydraulic pump 1 after A/D conversion thereof, a storage 110 for storing the preset relationship between the delivery pressure Pd of the hydraulic pump 1 and the drive signal i for the solenoid proportional valve 105, a processing unit 111 for reading the drive signal i corresponding to the delivery pressure Pd of the hydraulic pump 1 from the storage 110 and outputting it, and an output unit 113 for converting a signal output from the processing unit 111 into a current signal as the drive signal i and outputting it to the solenoid proportional valve 105.

Figure 3:
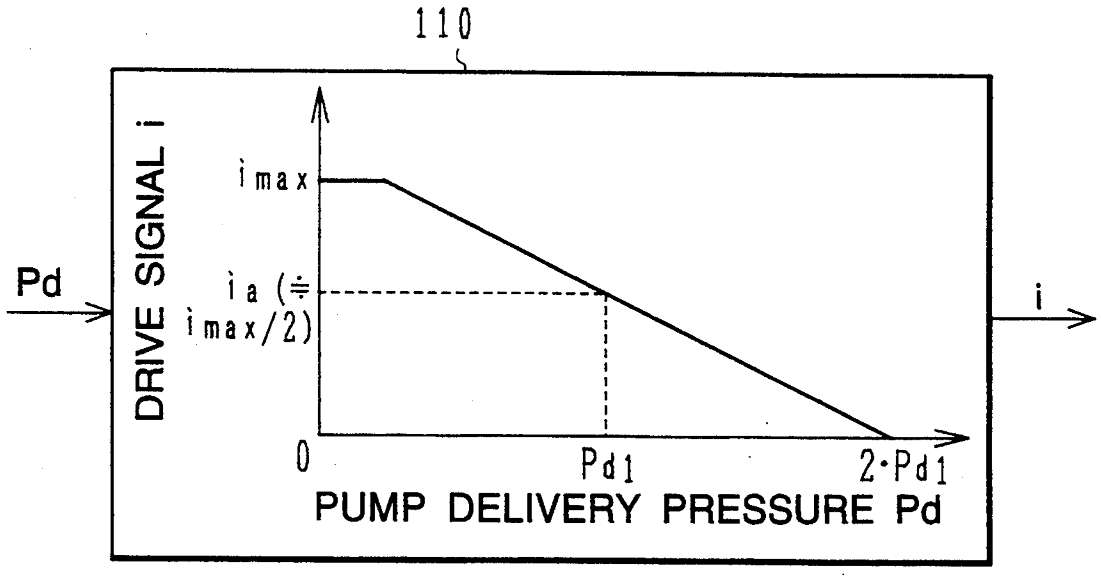
FIG. 3 is a representation showing the relationship between a delivery pressure of a hydraulic pump and a drive signal, which is stored in a storage of the controller in the first embodiment.
Figure 4:
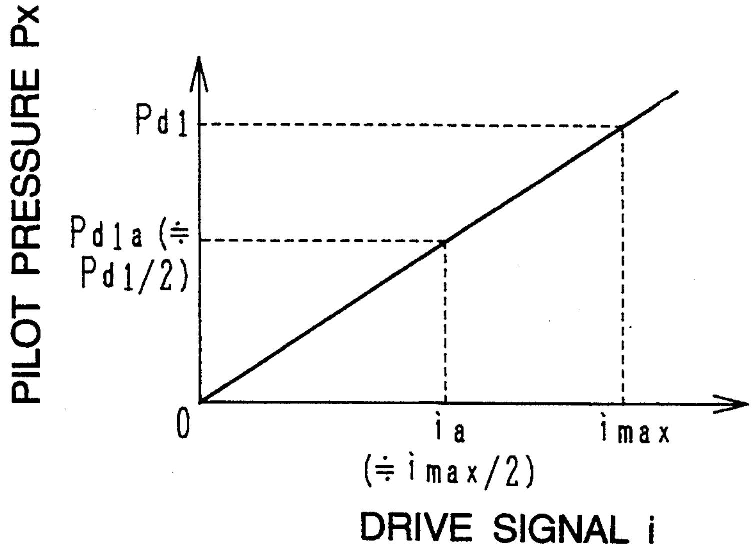
FIG. 4 is a graph showing the relationship between the drive signal and a pilot pressure applied to and generated by a solenoid proportional valve in the first embodiment.
Figure 5:
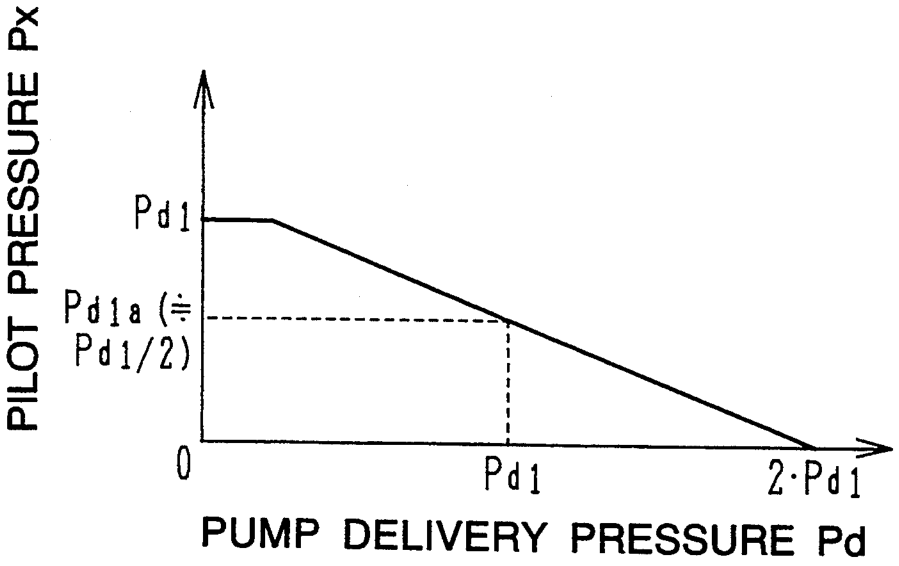
FIG. 5 is a graph showing the relationship between the delivery pressure of the hydraulic pump and the pilot pressure generated by the solenoid proportional valve in the first embodiment.

The relationship between the delivery pressure Pd of the hydraulic pump 1 and the drive signal i stored in the storage 110 is set such that, as shown in FIG. 3, the drive signal i is reduced as the delivery pressure Pd of the hydraulic pump 1 increases. An output characteristic of the solenoid proportional valve 105 is set such that, as shown in FIG. 4, the pilot pressure Px is increased as the drive signal i increases. Accordingly, the relationship between the delivery pressure Pd of the hydraulic pump 1 and the pilot pressure Px is given such that, as shown in FIG. 5, the pilot pressure Px is lowered as the pump delivery pressure Pd increases.

Figure 6:
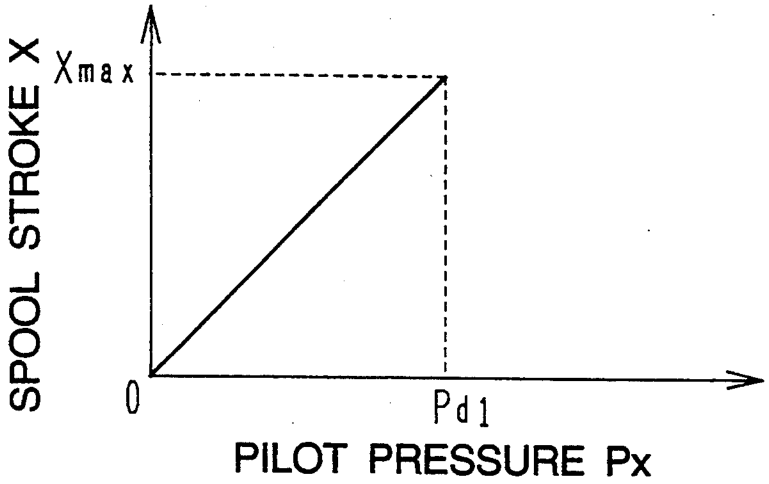
FIG. 6 is a graph showing the relationship between the pilot pressure and a spool stroke of a recovery control valve in the first embodiment.
Figure 7:
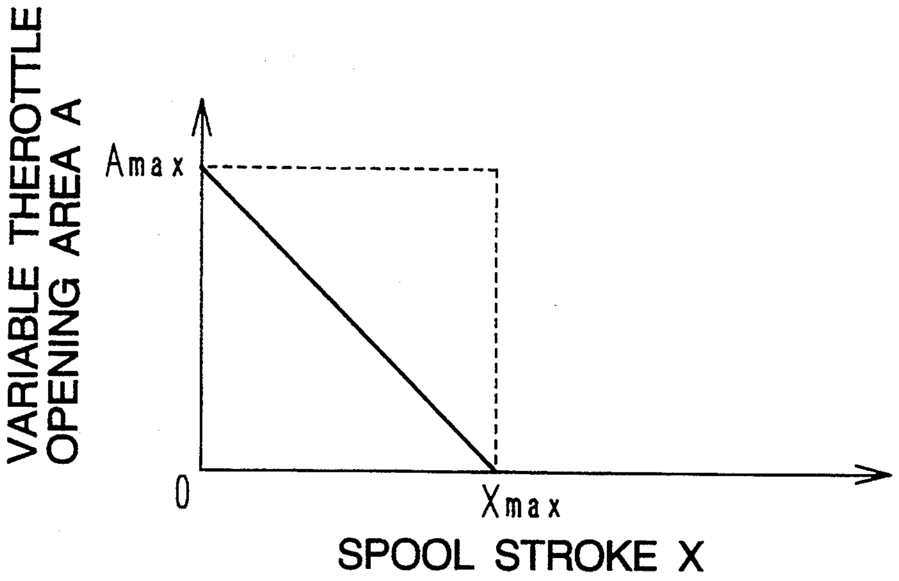
FIG. 7 is a graph showing the relationship between the spool stroke of the recovery control valve and an opening area of a variable throttle in the first embodiment.
Figure 8:
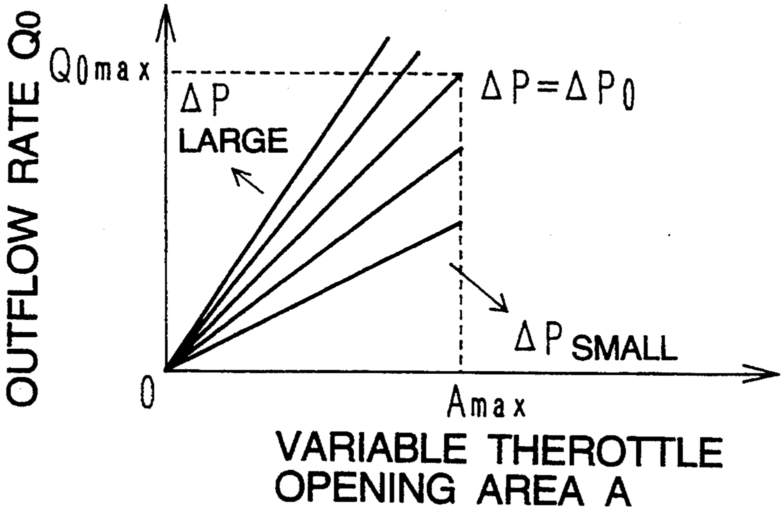
FIG. 8 is a graph showing the relationship among the opening area of the variable throttle of the recovery control valve, an outflow rate through the recovery control valve and a differential pressure across the variable throttle in the first embodiment.
Figure 9:
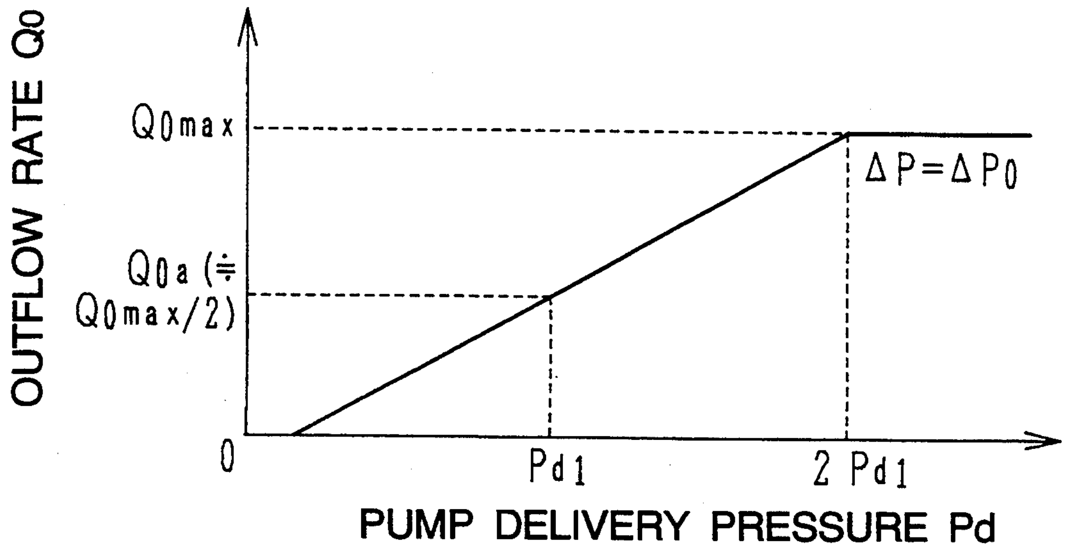
FIG. 9 is a graph showing the relationship between the pump delivery pressure and the outflow rate through the recovery control valve in the first embodiment.
Figure 10:
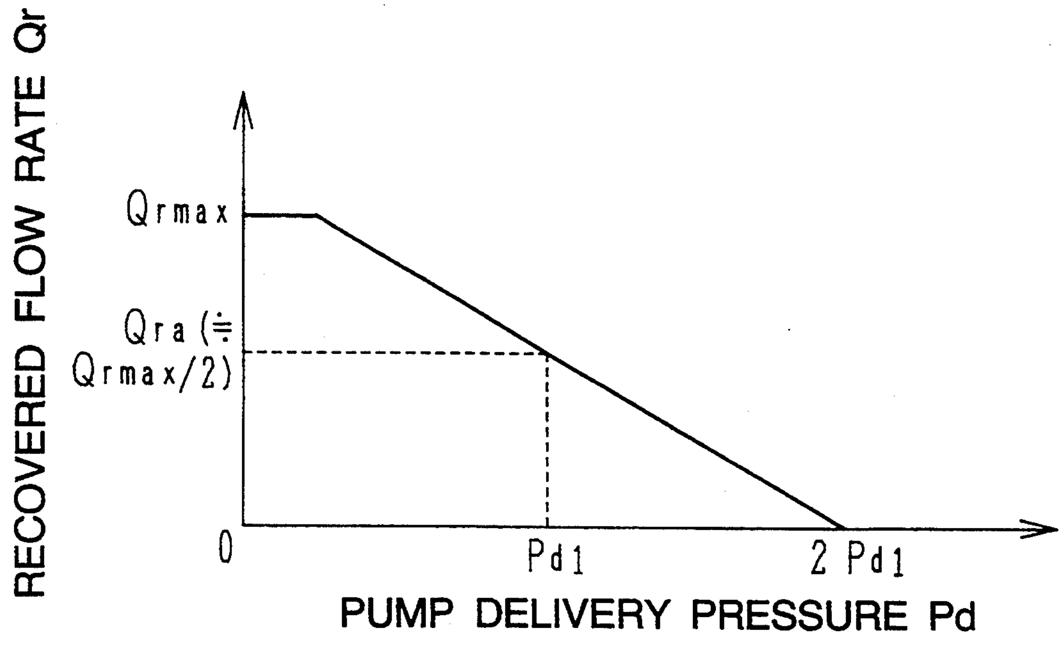
FIG. 10 is a graph showing the relationship between the pump delivery pressure and a recovered flow rate due to the recovery control valve in the first embodiment.

On the other hand, for the recovery control valve 6, a displacement x of the spool *6b* is substantially in proportion to the pilot pressure Px introduced to the hydraulic driving sector *6c*, as shown in FIG. 6, and an opening area A of the variable throttle *6a* is set to reduce as the displacement x of the spool *6b* increases, as shown in FIG. 7. Also, if a differential pressure ΔP across the variable throttle *6a* is fixed at ΔPo, a flow rate (outflow rate) Qo of the hydraulic fluid passing through the variable throttle *6a* is substantially in proportion to the opening area A of the variable throttle *6a*, as shown in FIG. 8. Therefore, the relationship between the delivery pressure Pd of the hydraulic pump 1 and the flow rate (outflow rate) Qo of the hydraulic fluid passing through the variable throttle *6a* is such that, as shown in FIG. 9, the outflow rate Qo is increased as the delivery pressure Pd of the hydraulic pump increased as the delivery pressure Pd of the hydraulic pump 1 increases. At this time, as shown in FIG. 10, a recovered flow rate Qr flowing from the first line 12 to the second line 10C via the third line 14 and the check valve 7 is reduced as the delivery pressure Pd of the hydraulic pump 1 increases.

The relationship between the pump delivery pressure Pd and the drive signal i stored in the storage 110 is optionally reloadable by using input means such as a keyboard 100*a*.

In the first embodiment arranged as above, by way of example, when the control lever unit 2A is operated to generate the pilot pressure Pia1 for shifting the directional control valve 2 into a position indicated by *2a*, the hydraulic fluid from the hydraulic pump 1 is allowed to flow into the directional control valve 2 via the delivery line 10A, the pump line 10B, the second line 10C, the check valve 8 and the pump 24 24, and is supplied to a bottom side hydraulic chamber 4*a* of the hydraulic cylinder 4 via an actuator port 22. The hydraulic cylinder 4 is thereby driven in a direction to extend its rod. On the other hand, the hydraulic fluid delivered from a rod side hydraulic chamber 4*b* with the operation of the hydraulic cylinder flows into the directional control valve 2 via its actuator port 21 and, after passing the reservoir port 23, is then drained to the reservoir 9 via the variable throttle *6a* of the recovery control valve 6.

In the above driving process of the hydraulic cylinder 4, when the load applied to the hydraulic cylinder 4 is small as resulted, by way of example, during horizontally drawing work in which an arm is turned into a vertically downward posture, the pressure in the bottom side hydraulic chamber 4*a* of the hydraulic cylinder 4 is low and the delivery pressure Pd of the hydraulic pump 1 detected by the pressure sensor 101 is also low. Hence the drive signal i having a large value is computed in the controller 100 (see FIG. 3) and is converted into a current signal by the output unit 113, the current signal being output to the solenoid proportional valve 105. Therefore, the pilot pressure Px is raised (see FIG. 5), the spool *6b* of the recovery control valve 6 is held on the side where the opening area A of the variable throttle *6a* becomes small (see FIGS. 6 and 7), and a pressure corresponding to the amount of restriction of the variable throttle *6a* is generated in the first line 12. At the time the pressure so generated exceeds the pressure in the second line 10C, a part of the return fluid flowing out of the reservoir port 23 to the first line 12 is allowed to pass into the second line 10C via the third line 14 and the check valve 7, and is then supplied to the pump port 24 after joining with the hydraulic fluid from the hydraulic pump 1. Thus, the flow rate of the hydraulic fluid supplied to the hydraulic cylinder 4 is increased by an amount corresponding to the recovered flow rate introduced from the first line 12, thereby increasing a moving speed of the hydraulic cylinder 4 accordingly.

On the other hand, when the load applied to the hydraulic cylinder 4 is large as resulted, by way of example, during digging work, the pressure in the bottom side hydraulic chamber 4*a* becomes high and the delivery pressure Pd of the hydraulic pump 1 detected by the pressure sensor 101 also becomes high. Hence the drive signal i having a small value is computed in the controller 100 and is output to the solenoid proportional valve 105 (see FIG. 3). Therefore, the pilot pressure Px is lowered (see FIG. 5), the spool *6b* of the recovery control valve 6 is moved to the side where the opening area A of the variable throttle *6a* becomes large (see FIGS. 6 and 7), and the pressure generated in the first line 12 by the variable throttle *6a* is lowered. As a result, the pressure in the first line 12 becomes lower than the pressure in the second line 10C, whereby the check valve 7 is closed and the return fluid flowing out of the reservoir port 23 to the first line 12 will not flow into the second line 10C (see FIG. 10) and is all drained to the reservoir 9 via the variable throttle 6*a* of the recovery control valve 6 (see FIG. 9). At this time, since the opening area of the variable throttle 6*a* is large, no substantial pressure loss due to the throttling occurs.

With this embodiment, as described above, when the load of the hydraulic cylinder 4 is small, at least a part of the hydraulic fluid returned from the hydraulic cylinder 4 to the reservoir 9 is recovered and used for driving the hydraulic cylinder 4, whereby the moving speed of the hydraulic cylinder 4 can be increased and hence the working efficiency can be improved. When the load of the hydraulic cylinder 4 is increased, driving force of the hydraulic cylinder 4 is also increased, enabling the load to be surely driven.

Further, with this embodiment, since the relationship between the delivery pressure Pd of the hydraulic pump 1 and the drive signal i for the solenoid proportional valve 105 stored in the storage 110 can be optionally set by using input means such as the keyboard 100*a*, as mentioned above, it is possible to gently change the flow rate passing through the variable throttle 6*a* of the recovery control valve 6 with respect to changes in the delivery pressure Pd of the hydraulic pump 1. This point will be described below in comparison with the prior art.

Figure 11:
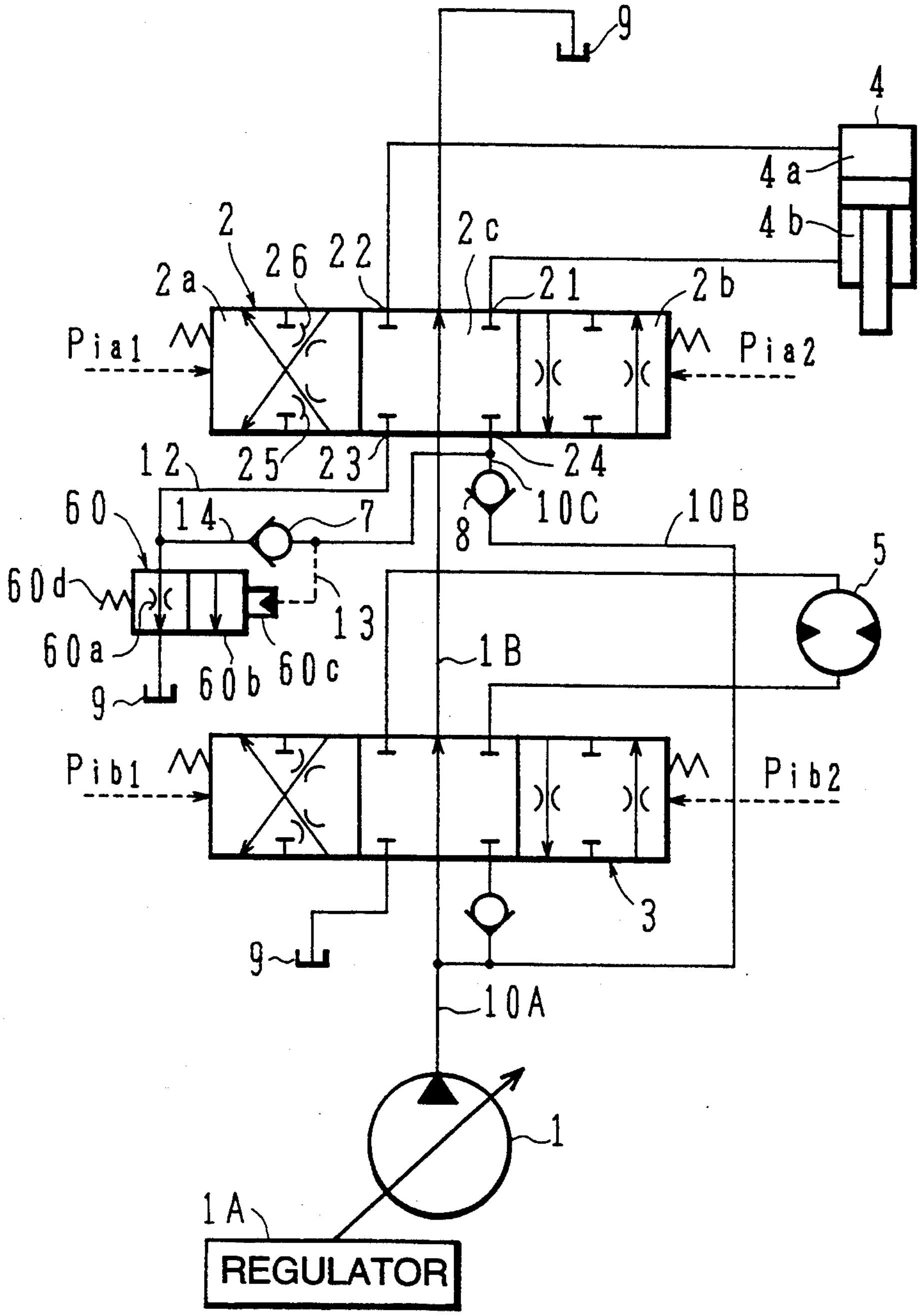
FIG. 11 is a diagram showing the entire arrangement of a hydraulic drive system equipped with a hydraulic recovery device as a comparative example.

FIG. 11 shows the prior art hydraulic recovery device described in the above-cited JP-B-4-57881 as a comparative example. In FIG. 11, identical members to those in FIG. 1 are denoted by the same reference numerals. The prior art hydraulic recovery device comprises a recovery control valve 60 disposed in a first line 12, a third line 14 communicating a portion of the first line 12 upstream of the recovery control valve 60 and a second line 10C, and a check valve 7 disposed in the third line 14 for allowing the hydraulic fluid to flow only in a direction from the first line 12 toward the second line 10C.

The recovery control valve 60 comprises a spool 60*b* formed with a variable throttle 60*a*, a hydraulic driving sector 60*c* to which the pressure in the second line 10C is introduced via a pilot line 13 for driving the spool 60B in the valve opening direction, and a set spring 60*d* for urging the spool 60*b* in the valve closing direction. An opening area (an amount of restriction) of the variable throttle 60*a* is set at the position where the pressure introduced to the hydraulic driving sector 60*c* and the urging force of the set spring 60*d* are balanced.

When a directional control valve is operated into a position indicated by 2*a* for driving the hydraulic cylinder 4 in a direction to extend its rod, the variable throttle 60*a* is held at its closed or throttled position while the load of the hydraulic cylinder 4 is small and pressing force due to the pressure in the second line 10C introduced to the hydraulic driving sector 60*c* of the recovery control valve 60 is smaller than the pressing force of the set spring 60*d*. Therefore, a pressure corresponding to the amount of restriction is generated in the first line 12. At the time the pressure so generated in the first line 12 exceeds the pressure in the second line 10C, a part of the return fluid flowing out of a reservoir port 23 of the directional control valve 2 to the first line 12 is allowed to pass into the second line 10C via the third line 14 and the check valve 7 for recovery, and is then supplied to a pump port 24 of the directional control valve 2 after joining with the hydraulic fluid from the hydraulic pump 1. Thus, the flow rate of the hydraulic fluid supplied to a bottom side hydraulic chamber 4*a* of a hydraulic cylinder 4 is increased by an amount corresponding to the recovered flow rate introduced from the first line 12, thereby increasing a moving speed of the hydraulic cylinder 4 accordingly.

On the other hand, when the load of the hydraulic cylinder 4 is increased and the pressure in the bottom side hydraulic chamber 4*a* is raised, the delivery pressure of a hydraulic pump 1 is raised and so is the pressure in the second line 10C introduced to the hydraulic driving sector 60*d* of the recovery control valve 60. Therefore, the spool 60*b* of the recovery control valve 60 is shifted in the valve opening direction and the pressure in the first line 12 is so reduced that the pressure in the second line 10C becomes higher than the pressure in the first line 12. As a result, the check valve 7 is held closed and driving force of the hydraulic cylinder is ensured against the large load.

In the prior art hydraulic recovery device described above, because the recovery control valve 60 generally used has a small size, the set spring 60*d* disposed in the recovery control valve 60 is obliged to have a short length and a small spring diameter. This results in a small spring constant and a steep displacement characteristic of the spool 60*b* with respect to the delivery pressure of the hydraulic pump 1 (the pressure in the second line 10C). Therefore, even with slight variations in the delivery pressure of the hydraulic pump 1 (the pressure in the second line 10C), the flow rate of the hydraulic fluid passing through the variable throttle 10*a* is abruptly changed.

Such a behavior will now be described with reference to FIGS. 12 to 15. It is assumed in the following description that the pressure in the second line 10C is equal to the delivery pressure Pd of the hydraulic pump 1.

Figure 12:
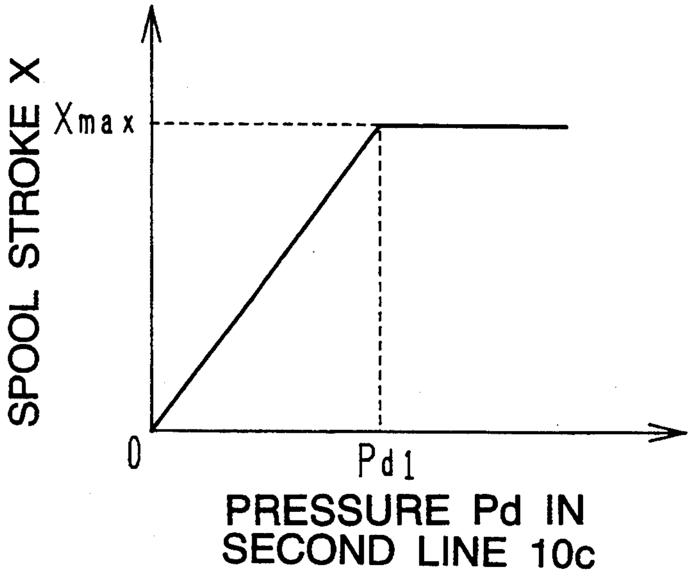
FIG. 12 is a graph showing the relationship between a second line pressure and a spool stroke of a recovery control valve in the comparative example.
Figure 13:
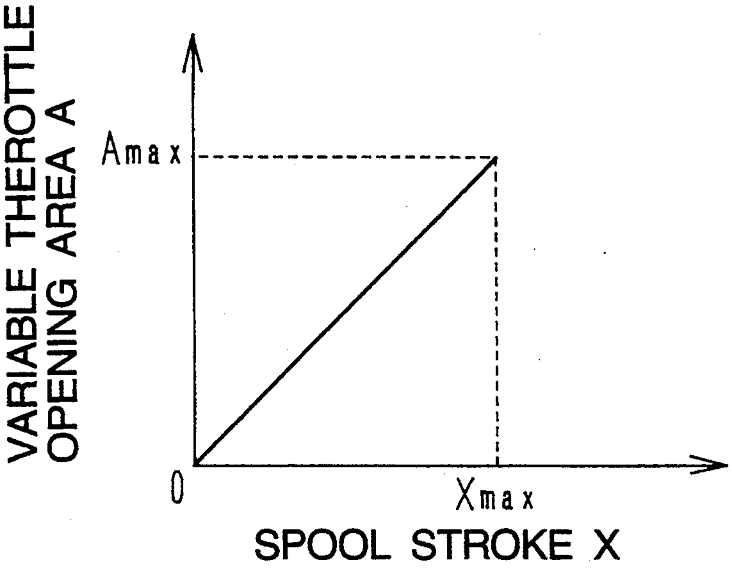
FIG. 13 is a graph showing the relationship between the spool stroke of the recovery control valve and an opening area of a variable throttle in the comparative example.
Figure 14:
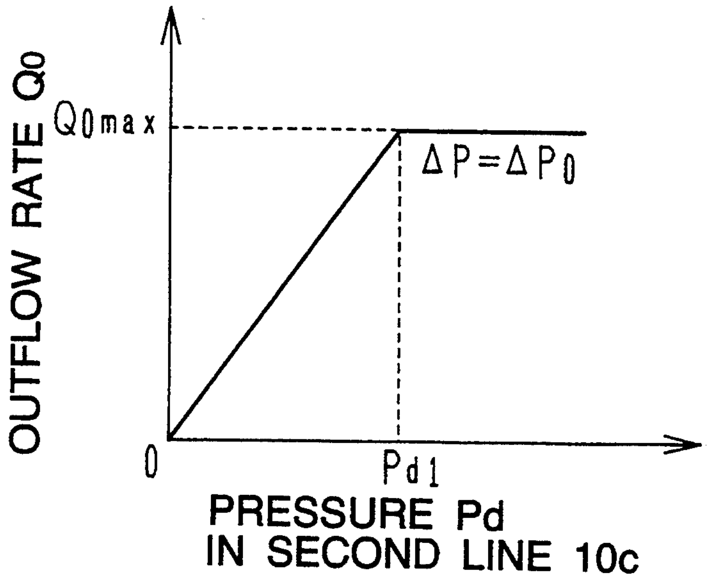
FIG. 14 is a graph showing the relationship between the second line pressure and an outflow rate through the recovery control valve in the comparative example.
Figure 15:
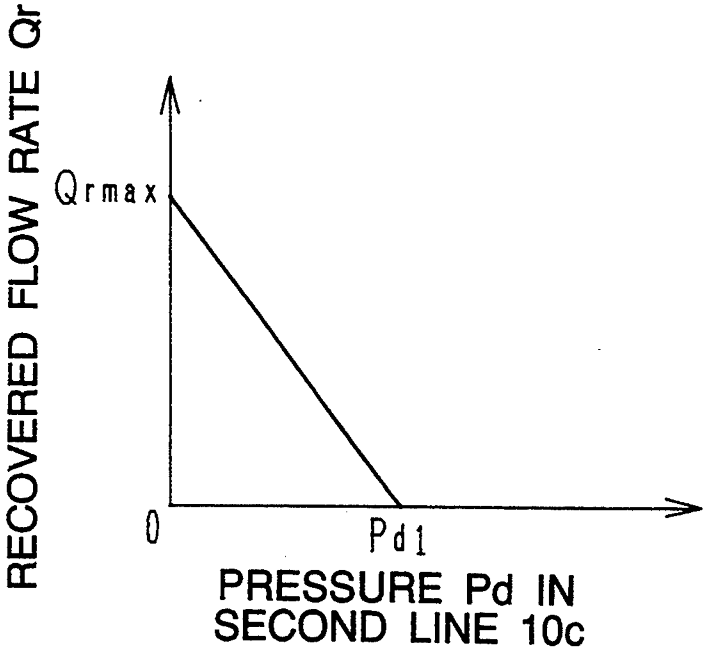
FIG. 15 is a graph showing the relationship between the second line pressure and a recovered flow rate in the comparative example.

In the recovery control valve 60, the relationship between the pressure Pd in the second line 10C and a stroke x of the spool 60*b* of the recovery control valve 60 is such that, as shown in FIG. 12, the spool stroke x takes a maximum xmax when the pressure Pd is at Pd1, and the spool stroke x is increased as the pressure Pd increases when the pressure Pd is less than Pd1. The pressure Pd1 is a value determined by the spring constant of the set spring 60*d*. The relationship between the spool stroke x and an opening area A of the variable throttle 60*a* is substantially proportional, as shown in FIG. 13. Also, if a differential pressure ΔP across the variable throttle 60*a* is fixed at ΔPo, a flow rate (outflow rate) Qo of the hydraulic fluid passing through the variable throttle 60*a* is substantially in proportion to the opening area A of the variable throttle 60*a*, as shown in FIG. 8 previously referred to. Therefore, the relationship between the delivery pressure Pd of the hydraulic pump 1 and the flow rate (outflow rate) Qo of the hydraulic fluid passing through the variable throttle 60*a* is such that, as shown in FIG. 14, the outflow rate Qo is increased as the delivery pressure Pd of the hydraulic pump 1 increases, and the outflow rate Qo passing through the variable throttle 60*a* reaches a maximum Qomax when the pressure in the second line 10C takes Pd1. At this time, as shown in FIG. 15, a recovered flow rate Qr flowing from the first line 12 to the second line 10C via the third line 14 and the check valve 7 is reduced as the delivery pressure Pd of the hydraulic pump 1 increases, and the recovered flow rate Qr becomes 0 when the pressure in the second line 10C takes Pd1.

Accordingly, on condition that the differential pressure across the variable throttle 60*a* is ΔPo, a change ΔQ in the outflow rate Qo per unit pressure variation is expressed by:

$$\Delta Q = Qomax/Pd1 \quad (1)$$

Herein, since the set spring 60*d* cannot have a large spring constant from the problem of a limited space as described above, Pd1 cannot be set to a so large value. Therefore, the pressure Pd1 corresponding to the maximum displacement of the set spring 60*d* has to be set to a relatively small value, meaning that the change ΔQ in the outflow rate Qo through the variable throttle 60*a* per unit pressure variation becomes large. In other words, with slight pressure variations in the second line 10C, the spool 60*b* is greatly displaced and the outflow rate through the variable throttle 60*a* is also greatly changed.

As a result, the following problems are caused: (1) if the delivery pressure of the hydraulic pump 1 is only slightly varied when the hydraulic cylinder is operated to extend its rod, the recovered flow rate from the first line 12 to the second line 10C is abruptly changed and the moving speed of the hydraulic cylinder 4 is quickly changed. Consequently, operability is much deteriorated; and (2) if the delivery pressure of the hydraulic pump 1 is only slightly varied, the outflow rate through the variable throttle 60*a* of the recovery control valve 60 is abruptly changed and hence pressure variations in the first line 12 and the second line 10C are increased, which gives rise to a fear of causing a hunting.

In contrast, such problems are not caused or suppressed to a minimum in this embodiment. For the sake of easier understanding, it is assumed in the following description that the set spring 6*d* of the recovery control valve 6 has the same spring constant as the set spring 60*d* of the recovery control valve 60 in the prior art device.

The storage 110 of the controller 100 stores the relationship between the delivery pressure Pd of the hydraulic pump 1 and the drive signal i set such that, as previously described with reference to FIG. 3, the drive signal i is reduced as the delivery pressure Pd increases. At the time of setting, the relationship is set in this embodiment such that the drive signal i takes a maximum value imax when the delivery pressure Pd of the hydraulic pump 1 is at 0, and becomes 0 when the delivery pressure Pd is at 2Pd1. Then, the drive signal becomes ia nearly ½ of the maximum value imax when the delivery pressure is at Pd1. The setting of such a relationship can be made without any restraints by using input means such as the keyboard 100*a*.

The output characteristic of the solenoid proportional valve 105 is set such that, as shown in FIG. 4, the pilot pressure Px takes Pd1 when the drive signal i is at the maximum value imax. Further, the pilot pressure Px becomes Pd1a nearly ½ of Pd1 when the drive signal is at ia. In the case of so setting the output characteristic of the solenoid proportional valve 105, the relationship between the pump delivery pressure Pd and the pilot pressure Px, shown in FIG. 5, is given such that the pilot pressure Px takes a maximum value Pd1 when the delivery pressure is at 0, becomes 0 when the delivery pressure is at 2Pd1, and becomes Pd1*a* nearly ½ of Pd1 when the delivery pressure is at Pd1.

On the other hand, since the set spring 6*d* of the recovery control valve 6 has the same spring constant as the set spring 60*d* of the recovery control valve 60 in the prior art device as described above, the spool stroke x takes a maximum value xmax when the pilot pressure Px is at the maximum value Pd1, as shown in FIG. 6, and the opening area of the variable throttle 6*a* also takes a maximum value Amax when the pilot pressure Px is at the maximum value Pd1, as shown in FIG. 7.

As a result of the foregoing, on condition that the differential pressure across the variable throttle 6*a* is fixed at ΔPo, the outflow rate Qo through the variable throttle 6*a* is 0 when the delivery pressure Pd of the hydraulic pump 1 is at 0 or low, and takes a maximum value Qomax when the pump delivery pressure is at 2Pd1, as shown in FIG. 9. Further, the recovered flow rate Qr takes a maximum value Qrmax when the pump delivery pressure is at 0 or low, and becomes 0 when the pump delivery pressure is at 2Pd1, as shown in FIG. 10. Accordingly, a change ΔQ in the outflow rate Qo through the variable throttle 6*a* per unit pressure variation in the delivery pressure Pd of the hydraulic pump 1 is expressed by:

$$\Delta Q = Qomax/(2 \times Pd1) \quad (2)$$

It is evident that the change in the outflow rate is halved in Equation (2) as compared with above Equation (1).

In addition, as the result of such a slow change in the outflow rate, the recovered flow rate from the first line 12 to the second line 10C is gently changed and hence the moving speed of the hydraulic cylinder 4 will not be abruptly changed.

The following advantages are provided by this first embodiment.

(a) Since the relationship between the delivery pressure Pd of the hydraulic pump 1 and the drive signal i output to the solenoid proportional valve 105 can be optionally, abrupt changes in the recovered flow rate caused by variations in the delivery pressure Pd of the hydraulic pump 1 can be avoided and hence the cylinder speed is prevented from changing abruptly. It is thus possible to improve operability as compared with the prior art.

(b) Since not only pressure variations in the first line 12 and the second line 10C can be kept down small, but also pressure pulsations particularly occurred upon start and stop of the hydraulic cylinder 4 can be removed by the low-pass filter 120, it is possible to effectively prevent a hunting and to ensure safety.

(c) Since the relationship between the delivery pressure Pd of the hydraulic pump 1 and the drive signal i stored in the storage 111 can be optionally set, the recovered flow rate can be reduced depending on the work to be carried out so that the moving speed of the hydraulic cylinder 4 is slowed down.

(d) Since the delivery pressure of the hydraulic pump 1 is directly detected rather than the pressure in the second line 10C and the recovered flow rate is controlled based on the detected value in this embodiment, the delivery pressure of the hydraulic pump 1 will not be largely changed even if the load imposed on the hydraulic cylinder 4 is abruptly changed to vary the load pressure to such an extent that the check valve 8 is closed. Therefore, the recovered flow rate is prevented from changing abruptly and can be stably controlled.

While the set spring 6*d* of the recovery control valve 6 in the first embodiment is selected to have the same spring constant as that in the prior art for brevity of the control valve having a spring with a small spring constant and to set the pilot pressure Px supplied by the solenoid proportional valve 105 to a lower value in accordance with resilient force of the spring.

Second Embodiment

Figure 16:
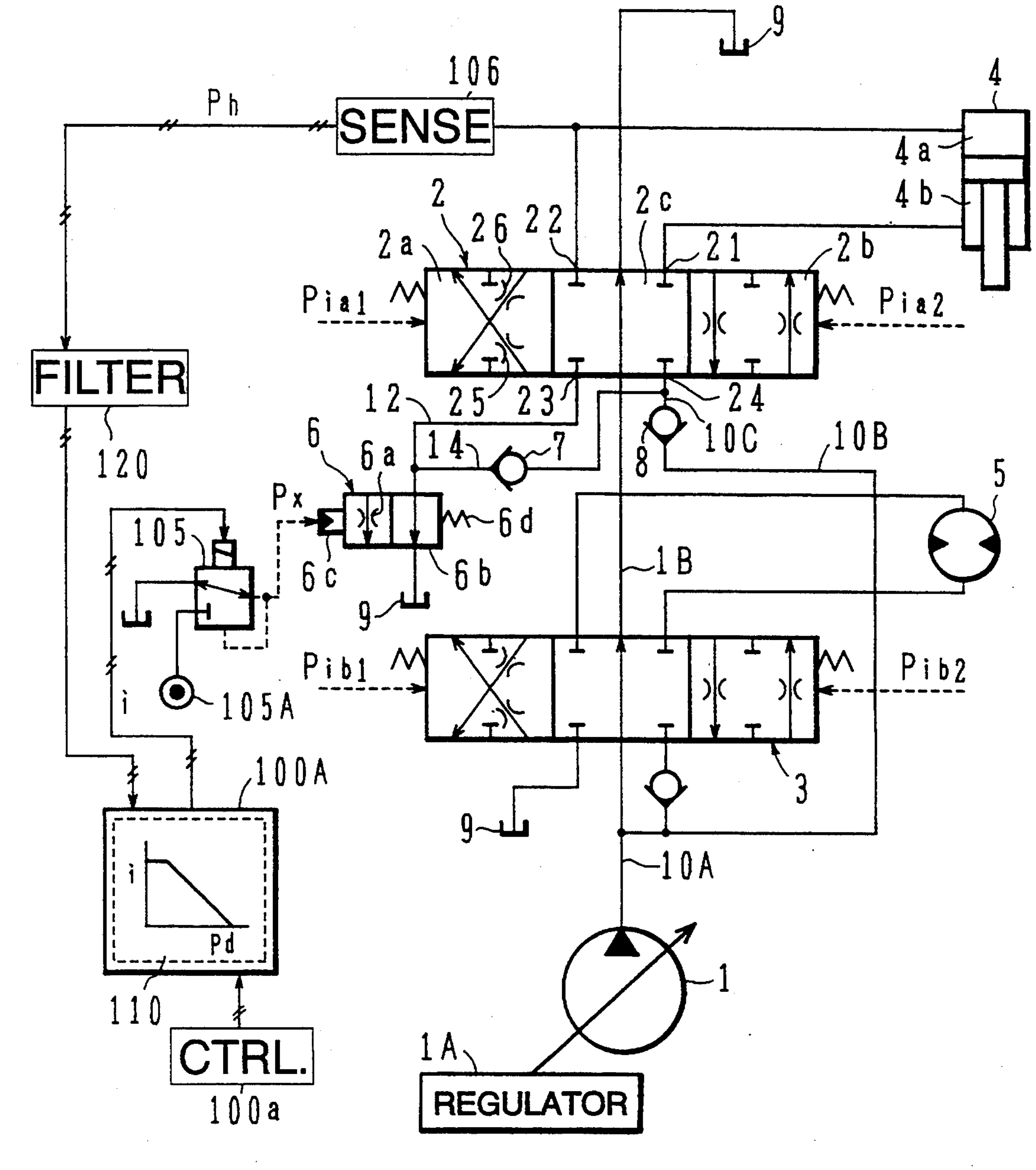
FIG. 16 is a diagram showing the entire arrangement of a hydraulic drive system equipped with a hydraulic recovery device according to a second embodiment of the present invention.

A second embodiment of the present invention will be described with reference to FIG. 16. In this figure, identical members to those in FIG. 1 are denoted by the same reference numerals.

This second embodiment includes a pressure sensor 106 for detecting a pressure in the bottom side hydraulic chamber 4*a* of the hydraulic cylinder 4, i.e., a load pressure Ph, as a condition variable related to the operation of the hydraulic cylinder 4. Also, the storage 110 of a controller 100A stores the relationship between the pressure Ph in the hydraulic chamber 4*a* of the hydraulic cylinder 4 and the drive signal i for the solenoid proportional valve 105. The relationship between the load pressure Ph and the drive signal i is set substantially similarly to the relationship between the pump delivery pressure Pd and the drive signal i in the first embodiment. The remaining is of the same arrangement as the above first embodiment.

When the hydraulic cylinder 4 is driven by the hydraulic fluid delivered from the hydraulic pump 1, the delivery pressure of the hydraulic pump 1 and the load pressure of the hydraulic cylinder 4 are changed while maintaining a fixed relationship such that the delivery pressure of the hydraulic pump 1 is raised when the load pressure of the hydraulic cylinder 4 becomes higher, and is lowered when the load pressure of the hydraulic cylinder 4 becomes lower. Therefore, the recovered flow rate can also be controlled similarly to the above first embodiment by detecting the load pressure of the hydraulic cylinder 4 instead of the delivery pressure of the hydraulic pump 1.

Further, in this embodiment, even with the directional control valve 2 held in its neutral position indicated by 2*c*, the pressure Ph in the bottom-side hydraulic chamber 4*a* of the hydraulic cylinder 4 is detected depending on a front posture including an arm of the hydraulic excavator (not shown), and the spool 6*b* of the recovery control valve 6 is operated correspondingly. Accordingly, the spool 6*b* of the recovery control valve 6 is always controlled to take a position depending on the load pressure of the hydraulic cylinder 4 regardless of the position of the directional control valve 2, whereby the recovered flow rate can be controlled without delay when the directional control valve 2 is shifted from the neutral position 2*c* to either shift position 2*a* or 2*b*.

An additional advantage is in that during the combined operation in which the hydraulic cylinder 4 and the hydraulic motor 5 are simultaneously driven, even if the load pressure of the hydraulic motor 5 is higher than the load pressure of the hydraulic cylinder 4, the recovered flow rate is less varied and can be surely controlled because pressure of the hydraulic motor 5.

As described above, this second embodiment can provide, in addition to the aforementioned advantages (a) to (c) obtainable with the first embodiment, advantages that the recovered flow rate will not be abruptly varied when the directional control valve 2 is shifted from the neutral position to either shift position, and the recovered flow rate is less varied and can be surely controlled even in the combined operation.

Third Embodiment

Figure 17:
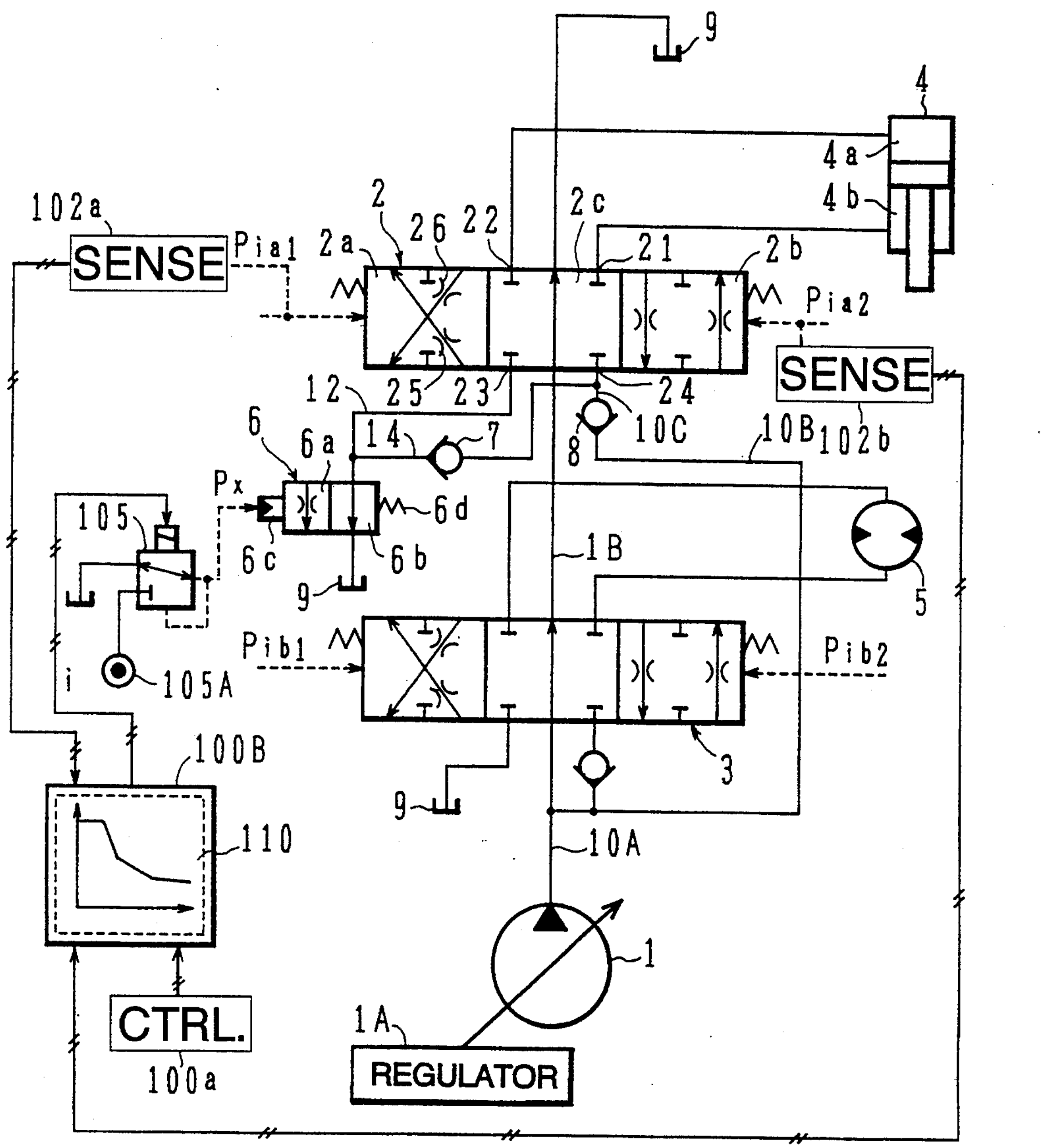
FIG. 17 is a diagram showing the entire arrangement of a hydraulic drive system equipped with a hydraulic recovery device according to a third embodiment of the present invention.
Figure 18:
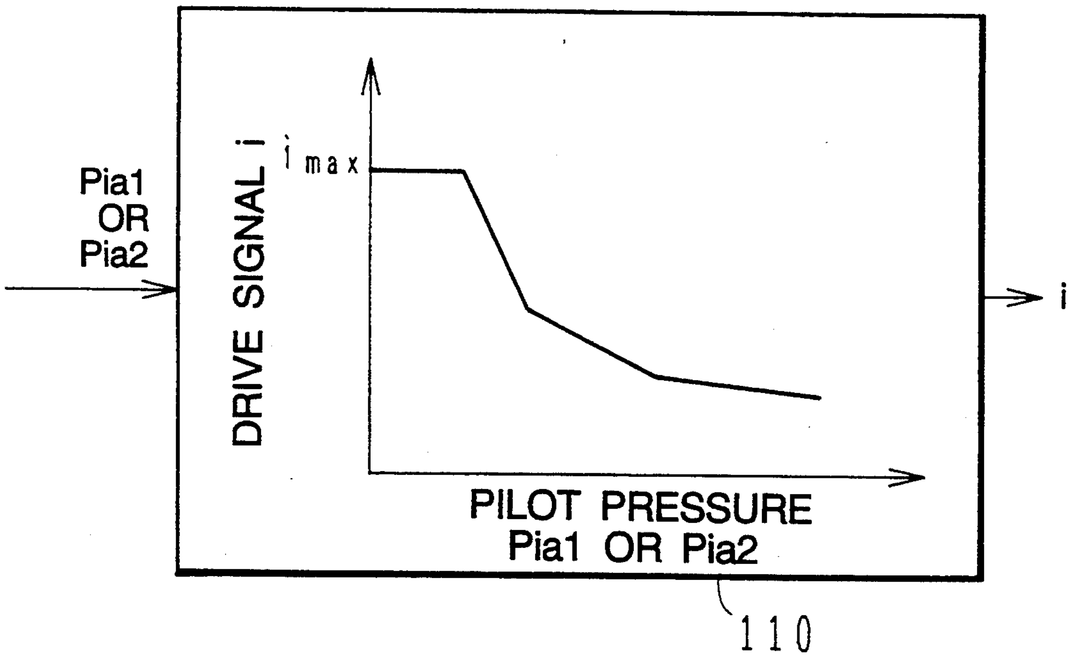
FIG. 18 is a representation showing the relationship between the pilot pressure and the drive signal, which is stored in the storage of a controller in the third embodiment.

A third embodiment of the present invention will be described with reference to FIGS. 17 and 18. In these figures, identical members to those in FIG. 1 are denoted by the same reference numerals.

This third embodiment includes pressure sensors 102*a*, 102*b* for respectively detecting pilot pressures Pia1, Pia2 applied to the directional control valve 2 as condition variables related to the operation of the hydraulic cylinder 4. Also, the storage 110 of a controller 100B stores the relationship between the pilot pressure Pia1 or Pia2 and the drive signal i for the solenoid proportional valve 105. The relationship between the pilot pressure Pia1 or Pia2 and the drive signal i for the solenoid proportional valve 105 is set such that, as shown in FIG. 18, the drive signal i takes the maximum value imax when the pilot pressure Pia1 or Pia2 is at 0 or low, and is reduced nonlinearly as the pilot pressure Pia1 or Pia2 increases. In other words, the relationship between the pilot pressure Pia1 or Pia2 and the drive signal i is set such that when the pilot pressure Pia1 or Pia2 is raised to a certain extent, the drive signal is more gently changed with respect to the pilot pressure and a pressure change caused in the second line 1C by the recovery control valve 6 per unit variation in the pilot pressure Pia1 or Pia2 becomes smaller than would be the case of directly driving the recovery variable throttle 6 with the pilot pressure Pia1 or Pia2. The remaining is of the same arrangement as the above first embodiment.

In the third embodiment thus arranged, the pilot pressures Pia1, Pia2 depending on a shift amount of the control lever unit 2A (see FIG. 1) for the directional control valve 2 are detected by the pressure sensors 102*a*, 102*b*, respectively, and signals corresponding to the pilot pressures Pia1, Pia2 are introduced to the controller 100. The processing unit 111 (see FIG. 2) in the controller 100 compares the values of the pilot pressure Pia1 and the pilot pressure Pia2, selects the higher pressure, and reads the drive signal i for the solenoid proportional valve 105, corresponding to the selected pressure, from the storage 111. Then, the drive signal i is converted into a current signal in the output unit 113 (see FIG. 2) and output to the solenoid proportional valve 105. The solenoid proportional valve 105 generates the pilot pressure Px corresponding to the drive signal i and the spool 6*b* of the recovery control valve 6 is controlled to move into a position corresponding to the pilot pressure Px.

With this third embodiment, since the drive signal is more gently changed when the pilot pressure Pia1 or Pia2 has been raised to a certain extent upon the manipulation of the control lever unit for the directional control valve 2, pressure changes in the second line 10C determined by the relationship between the opening areas of the meter-in variable throttle 24 of the directional control valve 2 and a bleed-off variable throttle (not shown) thereof for the center bypass line 1B and the opening area of the variable throttle 6*a* of the recovery control valve 6 are reduced and hence the recovered flow rate is less changed. Therefore, abrupt changes in the recovered flow rate can be avoided as with the first embodiment, making it possible to improve operability, effectively prevent the recovered flow rate from being subjected to a hunting, and hence to ensure safety.

Further, since the recovery control valve 6 is operated to recover the hydraulic fluid from the first line 12 to the second line 10C at the same time as when the directional control valve 2 is shifted from the neutral position 2c to either shift position 2a or 2b, it is possible to obviate the drawback that the recovery is started midway the manipulation of the control lever unit and the moving speed of the hydraulic cylinder 4 is quickly increased.

Consequently, this third embodiment can provide, in addition to the aforementioned advantages (a) to (c) obtainable with the first embodiment, an advantage of being able to further improve operability.

It should be noted that the third embodiment may be modified to add a measure for varying a change rate of the drive signal i in proportion to a change rate of the pilot pressure Pia1 or Pia2, thereby to control the driving speed of the recovery control valve 6, i.e., the moving speed of the spool 6b, depending on the manipulating speed of the control lever unit 2A. In this case, when the control lever unit 2A is rapidly manipulated, by way of example, to rapidly operate the directional control valve 2, the recovery control valve 6 is driven following the shifting operation of the directional control valve 2 with good response and, therefore, the recovered flow rate as required can be promptly supplied to the hydraulic cylinder 4 for further improving operability.

Fourth Embodiment

Figure 19:
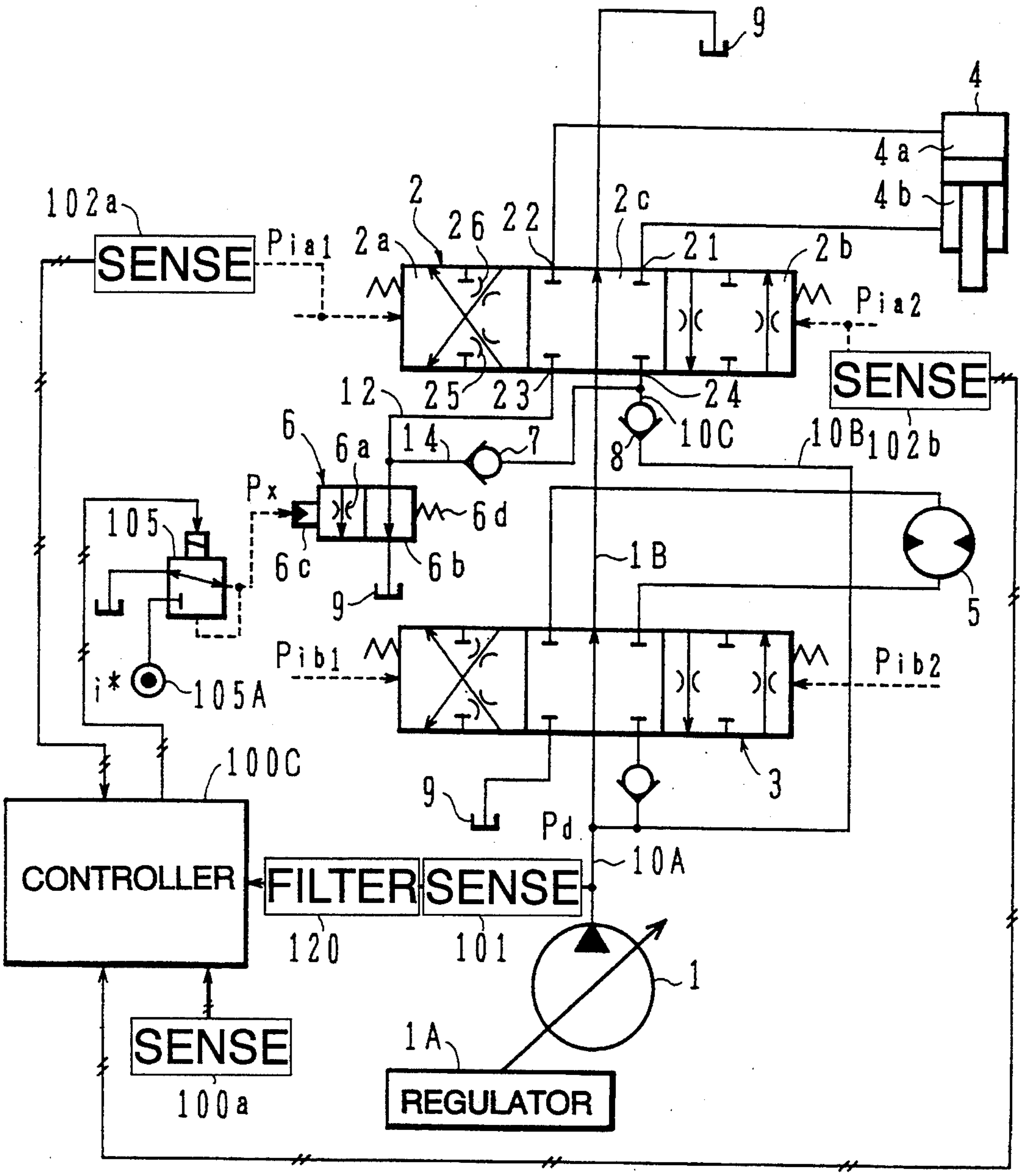
FIG. 19 is a diagram showing the entire arrangement of a hydraulic drive system equipped with a hydraulic recovery device according to a fourth embodiment of the present invention.
Figure 20:
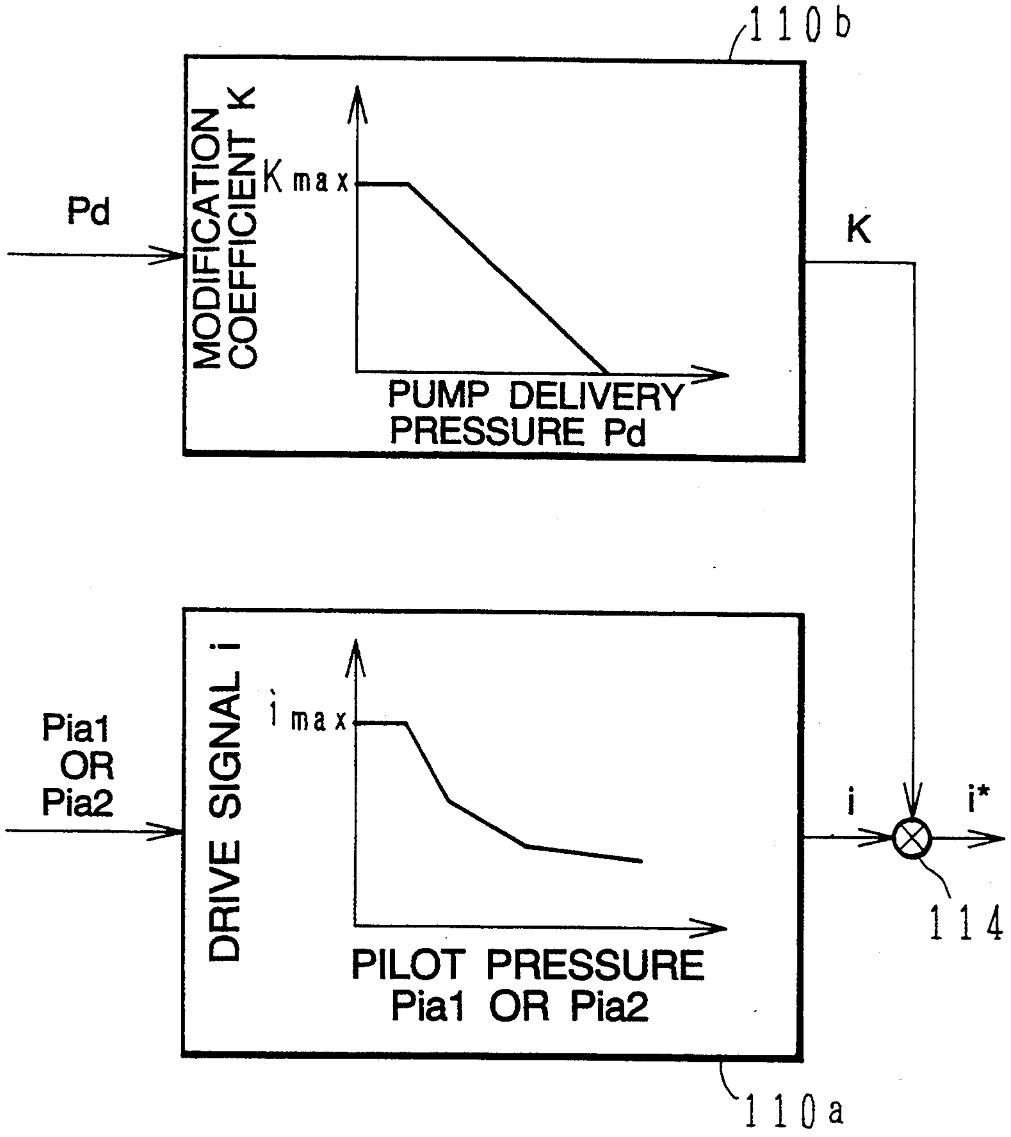
FIG. 20 is a representation showing the relationship between the pilot pressure and the drive signal and the relationship between the pump delivery pressure and a modification coefficient, which are stored in the storage of a controller in the fourth embodiment, as well as a processing function of the controller.

A fourth embodiment of the present invention will be described with reference to FIGS. 19 and 20. In these figures, identical members to those in FIGS. 1 and 17 are denoted by the same reference numerals.

This fourth embodiment includes the pressure sensor 101 for detecting the delivery pressure Pd of the hydraulic pump 1 and the pressure sensors 102a, 102b for respectively detecting the pilot pressures Pia1, Pia2 applied to the directional control valve 2, as means to detect condition variables related to the operation of the hydraulic cylinder 4. Also, the storage 110 (see FIG. 2) of a controller 100C comprises, as shown in FIG. 20, a storage section 110a for storing the relationship between the pilot pressure Pia1 or Pia2 and the drive signal i for the solenoid proportional valve 105, and a storage section 110a for storing the relationship between the delivery pressure Pd of the hydraulic pump 1 and a modification coefficient K. The relationship between the pilot pressure Pia1 or Pia2 and the drive signal i for the solenoid proportional valve 105 is set such that, similarly to the third embodiment, the drive signal i takes the maximum value imax when the pilot pressure Pia1 or Pia2 is at 0 or low, and is reduced as the pilot pressure Pia1 or Pia2 increases. The relationship between the delivery pressure Pd of the hydraulic pump 1 and the modification coefficient K is set such that the modification coefficient K takes a maximum value Kmax when the delivery pressure Pd of the hydraulic pump 1 is at 0 or low, and is reduced as the delivery pressure Pd increases. The controller 100C also has a multiplying function 114 for determining the product i* of the drive signal i and the modification coefficient K both read from the storage 110. The remaining is of the same arrangement as the above first and third embodiments.

In the fourth embodiment thus arranged, the pilot pressures Pia1, Pia2 depending on a shift amount of the control lever unit 2A (see FIG. 1) for the directional control valve 2 are detected by the pressure sensors 102a, 102b, respectively, and signals corresponding to the pilot pressures Pia1, Pia2 are introduced to the controller 100C. Also, the delivery pressure Pd of the hydraulic pump 1 is detected by the pressure sensor 101 and a signal corresponding to the delivery pressure Pd is introduced to the controller 100C via the low-pass filter 120. The processing unit 111 (see FIG. 2) in the controller 100C compares the values of the pilot pressure Pia1 and the pilot pressure Pia2, selects the higher pressure, and reads the drive signal i for the solenoid proportional valve 105, corresponding to the selected pressure, from the storage 111 and, simultaneously, it reads the modification coefficient K corresponding to the delivery pressure Pd of the hydraulic pump 1 from the storage 110, followed by determining the product i* of the drive signal i and the modification coefficient K both read from the storage 110. Then, the value i* is converted into a current signal in the output unit 113 (see FIG. 2) and output as a drive signal i* to the solenoid proportional valve 105. The solenoid proportional valve 105 generates the pilot pressure Px corresponding to the drive signal i* and the spool 6b of the recovery control valve 6 is controlled to move into a position corresponding to the pilot pressure Px.

With this fourth embodiment, the recovery control valve 6 is started to operate at the same time as when the directional control valve 2 is shifted from the neutral position 2c to either shift position 2a or 2b upon the manipulation of the control lever unit for the directional control valve 2, and the recovery control valve 6 is also operated depending on condition of the delivery pressure Pd of the hydraulic pump 1, thereby controlling the recovered flow rate. Consequently, the advantages of both the first and third embodiments are obtained, resulting in further improved operability as compared with the prior art.

While the fourth embodiment is arranged to compute the drive signal i based on the pilot pressure Pia1, Pia2 and compute the modification coefficient K based on the delivery pressure Pd of the hydraulic pump 1, the process may be reverses so as to compute the drive signal i based on the delivery pressure Pd of the hydraulic pump 1 and compute the modification coefficient k based on the pilot pressure Pia1, Pia2. Further, while the drive signal i* is determined by multiplying the drive signal i by the modification coefficient K in the fourth embodiment, the process may be modified so as to compute a first drive signal i1 from one of the pilot pressure Pia1, Pia2 and the delivery pressure Pd of the hydraulic pump 1, compute a second drive signal i2 from the other, and then to add both the drive signals for determining the drive signal i*.

Fifth Embodiment

A fifth embodiment of the present invention will be described with reference to FIGS. 21 and 22. In these figures, identical members to those in FIGS. 1 and 17 are denoted by the same reference numerals.

Figure 21:
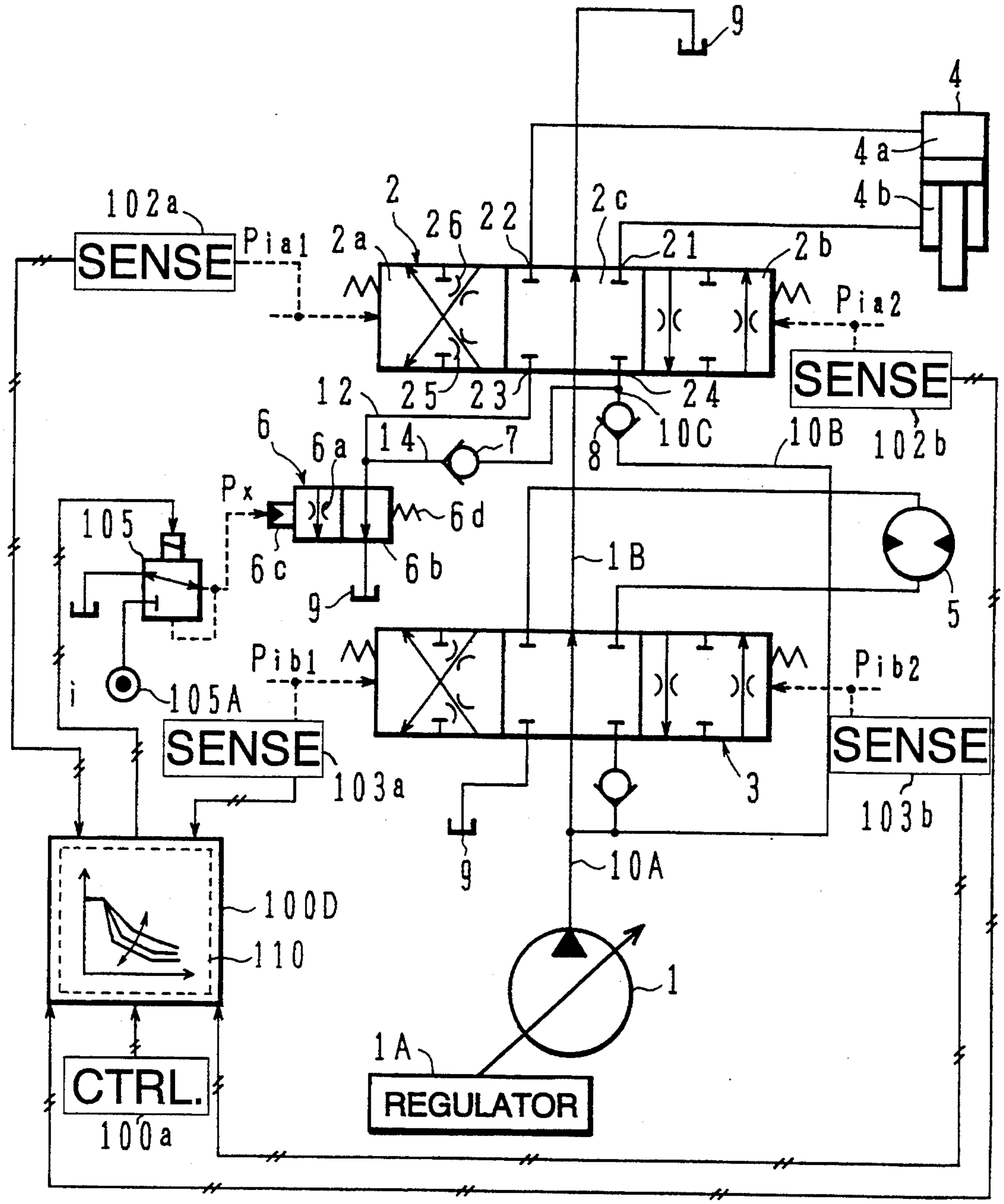
FIG. 21 is a diagram showing the entire arrangement of a hydraulic drive system equipped with a hydraulic recovery device according to a fifth embodiment of the present invention.
Figure 22:
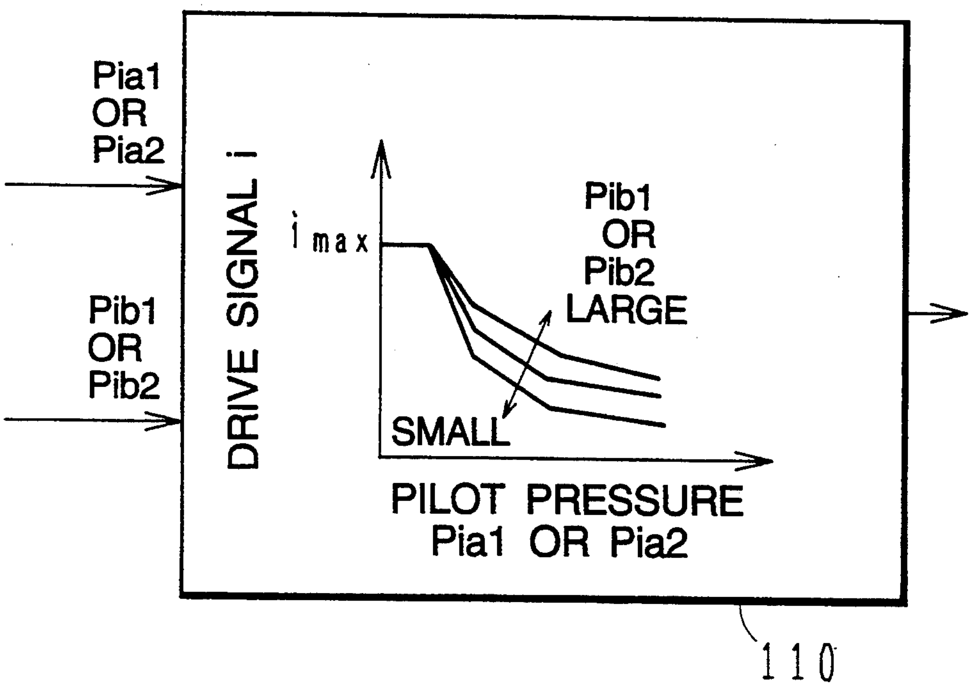
FIG. 22 is a representation showing the relationship between pilot pressures and the drive signal, which is stored in the storage of a controller in the fifth embodiment.

This third embodiment includes, as shown in FIG. 21, the pressure sensors 102a, 102b and pressure sensors 103a, 103b for respectively detecting the pilot pressures Pia1, Pia2 and pilot pressures Pib1, Pib2 applied to the directional control valves 2, 3 as condition variables related to the operation of the hydraulic cylinder 4. Also, the storage 110 (see FIG. 2) of a controller 100D stores the relationship between the pilot pressures Pia1, Pia2 and Pib1, Pib2 and the drive signal i for the solenoid proportional valve 105 as shown in FIG. 22. The relationship between the pilot pressures Pia1, Pia2 and Pib1, Pib2 and the drive signal i for the solenoid proportional valve 105 is set such that the drive signal i takes the maximum value imax when the pilot pressure Pia1 or Pia2 is at 0 or low, and is reduced as the pilot pressure Pia1 or Pia2 increases, and that the drive signal i is small when the pilot pressure Pib1 or Pib2 is low, and becomes larger as the pilot pressure Pib1 or Pib2 increases. The remaining is of the same arrangement as the above first and third embodiments.

In the fifth embodiment thus arranged, the pilot pressures Pia1, Pia2 and Pib1, Pib2 depending on shift amounts of the control lever units 2A, 2B (see FIG. 1) for the directional control valves 2, 3 are detected by the pressure sensors 102*a*, 102*b* and 103*a*, 103*b*, respectively, and signals corresponding to these pilot pressures are introduced to the controller 100D. The processing unit 111 (see FIG. 2) in the controller 100 compares the values of the pilot pressures Pia1 and Pia2 of the directional control valve 2 and the values of the pilot pressures Pib1 and Pib2 valve 2 and the values of the pilot pressures Pib1 and Pib2 of the directional control valve 3, selects the respective higher pressures, and reads the drive signal i for the solenoid proportional valve 105, corresponding to these selected pressures, from the storage 111. Then, the drive signal i is converted into a current signal in the output unit 113 (see FIG. 2) and output to the solenoid proportional valve 105. The solenoid proportional valve 105 generates the pilot pressure Px corresponding to the drive signal i and the spool *6b* of the recovery control valve 6 is controlled to move into a position corresponding to the pilot pressure Px.

With this fifth embodiment, when only the control lever unit 2A (see FIG. 1) for the directional control valve 2 is manipulated, the recovered flow rate is controlled depending on the shift amount of the directional control valve 2 and, therefore, the similar advantage to the third embodiment can be obtained.

Further, when both the control lever units 2A, 3A for the directional control valves 2, 3 are simultaneously manipulated, the drive signal i becomes larger and the recovered flow rate is increased as the control lever unit 3A for the directional control valve 3 is manipulated in a larger amount and the flow rate supplied to the hydraulic motor 5 increases. During the combined operation of an arm and a swing (not shown), therefore, even if the flow rate supplied to the hydraulic cylinder (arm cylinder) 4 is reduced because of the increased flow rate supplied to the hydraulic motor 5 (swing motor), the recovered flow rate can be increased correspondingly to speed up the hydraulic cylinder (arm cylinder) 4, resulting in an advantage that operability is improved in the combined operation.

Sixth Embodiment

Figure 23:
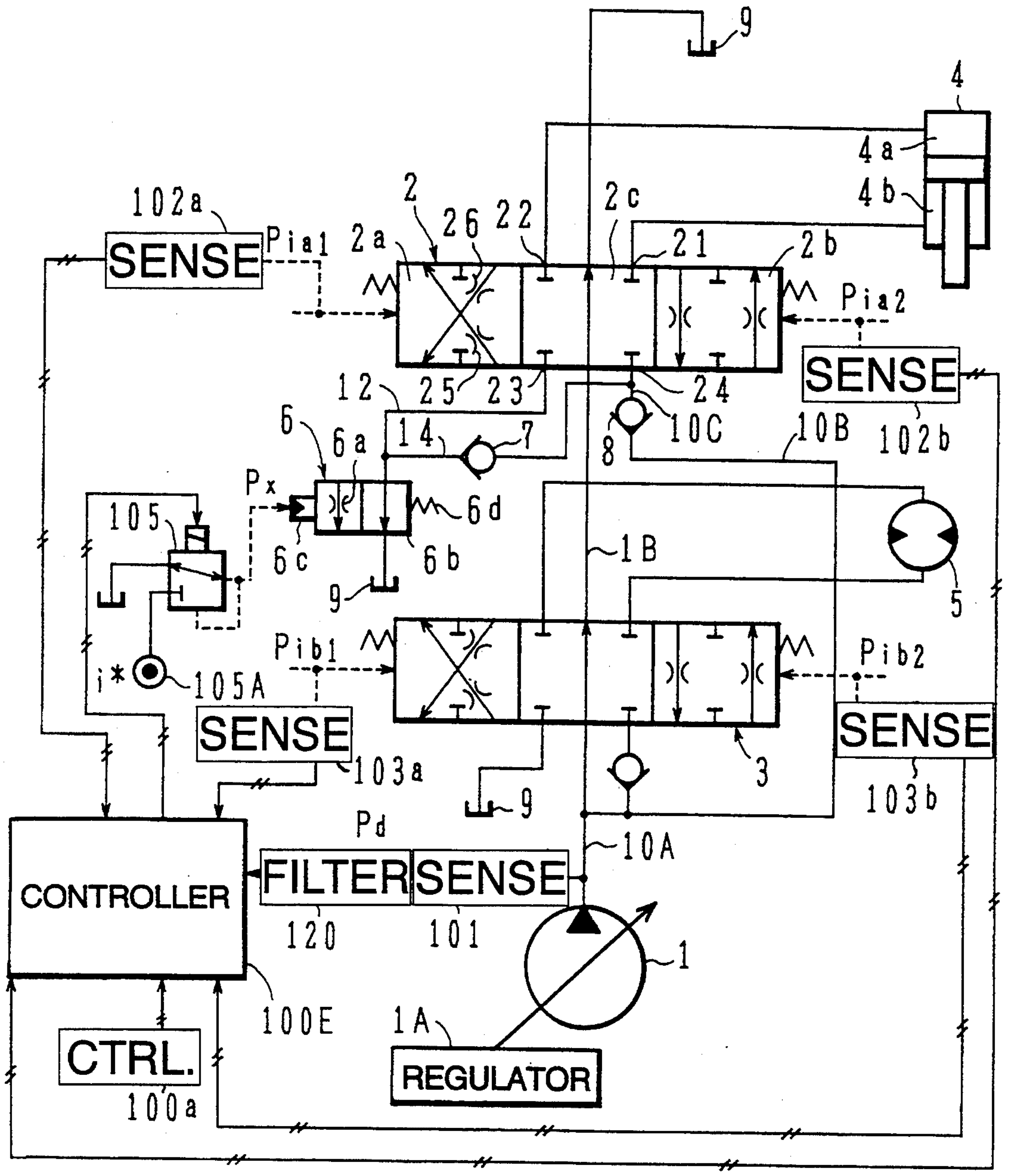
FIG. 23 is a diagram showing the entire arrangement of a hydraulic drive system equipped with a hydraulic recovery device according to a sixth embodiment of the present invention.
Figure 24:
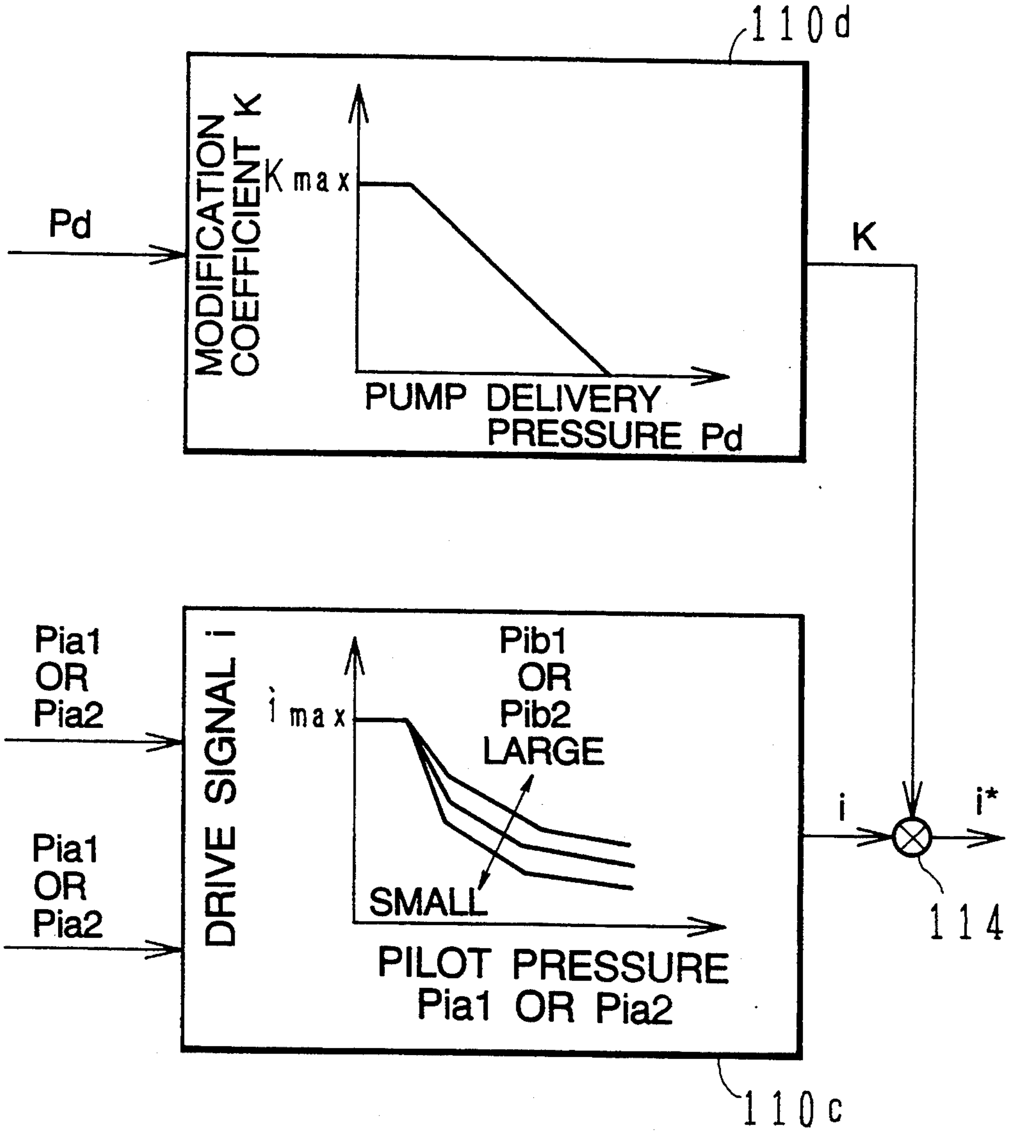
FIG. 24 is a representation showing the relationship between the pilot pressures and the drive signal and the relationship between the pump delivery pressure and a modification coefficient, which are stored in the storage of a controller in the sixth embodiment, as well as a processing function of the controller.

A sixth embodiment of the present invention will be described with reference to FIGS. 23 and 24. In these figures, identical members to those in FIGS. 1, 17 and 21 are denoted by the same reference numerals.

This sixth embodiment includes the pressure sensors 102*a*, 102*b* and 103*a*, 103*b* for respectively detecting the pilot pressures Pia1, Pia2 and Pib1, Pib2 applied to the directional control valves 2, 3, and the pressure sensor 101 for detecting the delivery pressure Pd of the hydraulic pump 1, as means to detect condition variables related to the operation of the hydraulic cylinder 4. Also, the storage 110 (see FIG. 2) of a controller 100E comprises, as shown in FIG. 23, a storage section 110c for storing the relationship between the pilot pressures Pia1, Pia2 and Pib1, Pib2 and the drive signal i for the solenoid proportional valve 105, and a storage section 110*d* for storing the relationship between the delivery pressure Pd of the hydraulic pump 1 and the modification coefficient K. The relationship between the pilot pressures Pia1, Pia2 and Pib1, Pib2 and the drive signal i for the solenoid proportional valve 105 is set such that, similarly to the fifth embodiment, the drive signal i takes the maximum value imax when the pilot pressure Pia1 or Pia2 is at 0 or low, and is when the pilot pressure Pia1 or Pia2 is at 0 or low, and is reduced as the pilot pressure Pia1 or Pia2 increases, and that the drive signal i is small when the pilot pressure Pib1 or Pib2 is low, and becomes larger as the pilot pressure Pib1 or Pib2 increases. The relationship between the delivery pressure Pd of the hydraulic pump 1 and the modification coefficient K is set such that, similarly to the fourth embodiment, the modification coefficient K takes the maximum value Kmax when the delivery pressure Pd of the hydraulic pump 1 is at 0 or low, and is reduced as the delivery pressure Pd increases. The controller 100E also has a multiplying function 114 for determining the product i* of the drive signal i and the modification coefficient K both read from the storage 110. The remaining is of the same arrangement as the above first and third embodiments.

In the sixth embodiment thus arranged, the pilot pressures Pia1, Pia2 and Pib1, Pib2 depending on shift amounts of the control lever units 2A, 2B (see FIG. 1) for the directional control valves 2, 3 are detected by the pressure sensors 102*a*, 102*b* and 103*a*, 103*b*, respectively, the delivery pressure Pd of the hydraulic pump 1 is detected by the pressure sensor 101, and signals corresponding to these pressures are introduced to the controller 100E. The processing unit 111 (see FIG. 2) in the controller 100E compares the values of the pilot pressures Pia1 and Pia2 of the directional control valve 2 and the values of the pilot pressures Pib1 and Pib2 of the directional control valve 3, selects the respective higher pressures, and reads the drive signal i for the solenoid proportional valve 105, corresponding to these selected pressures, from the storage 111. Further, the processing unit 111 reads the modification coefficient K corresponding to the delivery pressure Pd of the hydraulic pump 1 from the storage 110, followed by computing the product i* of the modification coefficient K and the drive signal i. Then, the value i* is converted into a current signal in the output unit 113 (see FIG. 2) and output to the solenoid proportional valve 105. The solenoid proportional valve 105 generates the pilot pressure Px corresponding to the drive signal i and the spool *6b* of the recovery control valve 6 is controlled to move into a position corresponding to the pilot pressure Px.

With this sixth embodiment, when only the control lever unit 2A (see FIG. 1) for the directional control valve 2 is manipulated, the recovered flow rate is controlled depending on the shift amount of the directional control valve 2 and the pump delivery pressure. Therefore, abrupt changes in the recovered flow rate can be prevented to improve operability as with the fourth embodiment, while the advantages of both the first and third embodiments are obtained.

Further, when both the control lever units 2A, 3A for the directional control valves 2, 3 are simultaneously manipulated, the recovered flow rate is controlled depending on the shift amounts of the directional control valves 2, 3 and the pump delivery pressure. Therefore, abrupt changes in the recovered flow rate can be prevented to improve operability, and the speed of the hydraulic cylinder can be increased even during the combined operation of an arm and a swing (not shown), whereby the advantages of both the forth and fifth embodiments are obtained.

Seventh Embodiment

A seventh embodiment of the present invention will be described with reference to FIGS. 25 and 26. In these figures, identical members to those in FIGS. 1, 17 and 21 are denoted by the same reference numerals.

This seventh embodiment includes, similarly to the sixth embodiment, the pressure sensors 102*a*, 102*b* and 103*a*, 103*b* and the pressure sensor 101. Also, the storage 110 of a controller 100 comprises, as shown in FIG. 26, storage sections 110*e*, 110*f* for respectively storing the first and second relationships between the pilot pressures Pia1, Pia2 and Pib1, Pib2 and the drive signal i for the solenoid proportional valve 105, and a storage section 110*g* for storing the relationship between the delivery pressure Pd of the hydraulic pump 1 and the modification coefficient K. The first and second relationships between the pilot pressures Pia1, Pia2 and Pib1, Pib2 and the drive signal i for the solenoid proportional valve 105 are each set such that, similarly to the fifth embodiment, the drive signal i takes the maximum value imax when the pilot pressure Pia1 or Pia2 is at 0 or low, and is reduced as the pilot pressure Pia1 or Pia2 increases, and that the drive signal i is small when the pilot pressure Pib1 or Pib2 is low, and becomes larger as the pilot pressure Pib1 or Pib2 increases. Of two the relationships, the first one stored in the storage section 110*e* is set with respect to the second one stored in the storage section 110*f* such that the drive signal i computed in accordance with the first one has a greater value at the same pilot pressure than the drive signal computed in accordance with the second one, thereby producing the larger recovered flow rate. The relationship between the delivery pressure Pd of the hydraulic pump 1 and the modification coefficient K is set such, similarly to the fourth embodiment, that the modification coefficient K takes the maximum value Kmax when the delivery pressure Pd of the hydraulic pump 1 is at 0 or low, and is reduced as the delivery pressure Pd increases.

This seventh embodiment further includes a mode switch 104, and the controller 100F has a select function 115 for selecting one of the drive signal i obtained from the first relationship stored in the storage section 110*e* and the drive signal i obtained from the second relationship stored in the storage section 110*f* in response to an on/off signal from the mode switch 104, and also has a multiplying function 114 for determining the product i* of the selected drive signal i and the modification coefficient K. The remaining is of the same arrangement as the sixth embodiment.

In the seventh embodiment thus arranged, the processing unit 111 (see FIG. 2) reads the drive signals corresponding to signals from the pressure sensors 102*a*, 102*b*, 103*a*, 103*b* from the storage sections 110*e*, 110*f*, and selects one of those drive signals i in response to the on/off signal from the mode switch 104. Further, the processing unit 111 reads the modification coefficient K corresponding to the delivery pressure Pd of the hydraulic pump 1 from the storage section 110*g*, followed by computing the product i* of the modification coefficient K and the drive signal i.

This seventh embodiment can provide, in addition to the advantages of the sixth embodiment, an advantage that by operating the mode switch 104 to increase or decrease the recovered flow rate, the recovered flow rate can be controlled in a more appropriate manner with a further improvement in operability.

Eighth Embodiment

Figure 27:
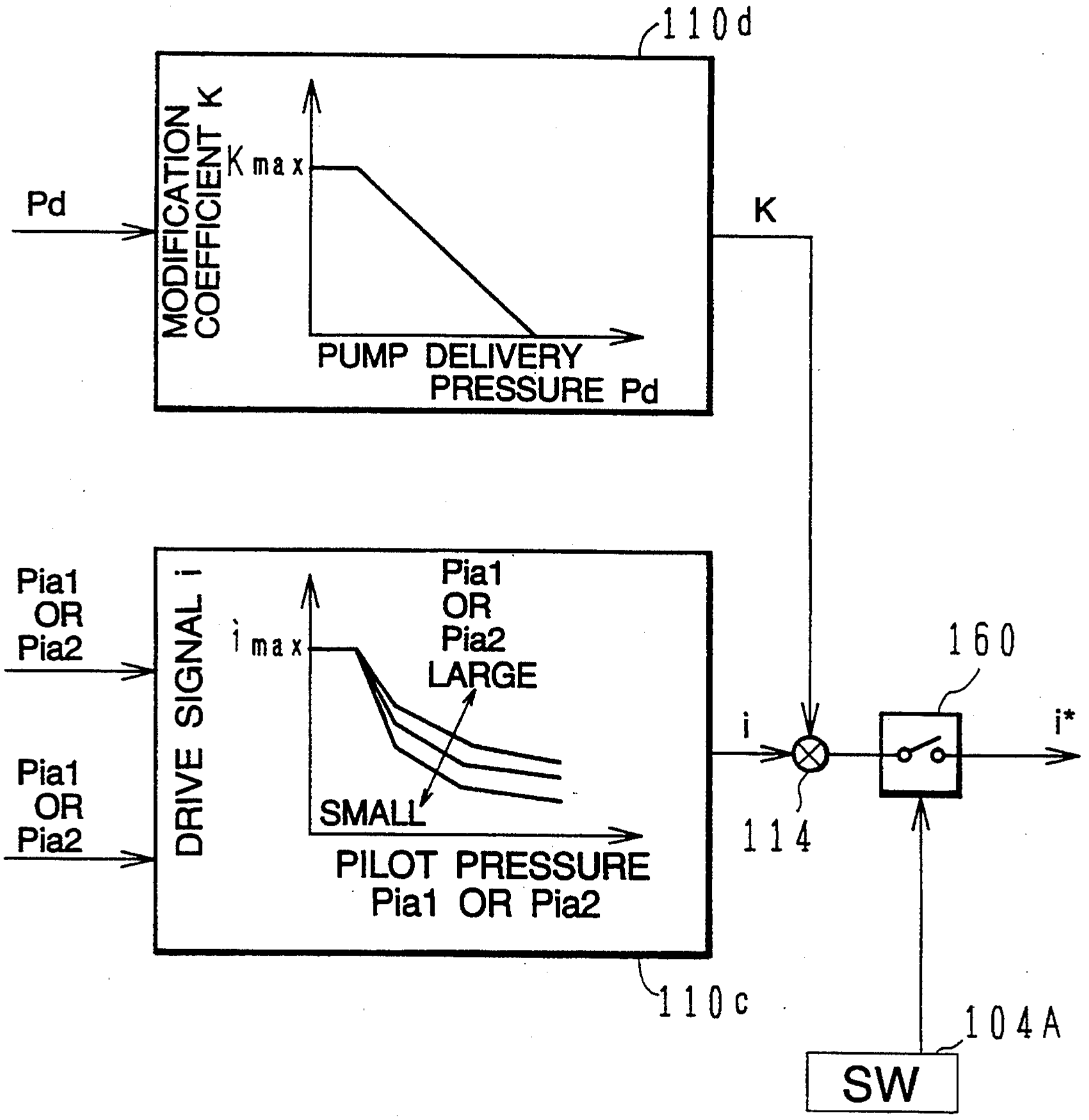
FIG. 27 is a representation showing the relationship between the pilot pressures and the drive signal and the relationship between the pump delivery pressure and a modification coefficient, which are stored in the storage of a controller in an eighth embodiment, as well as a processing function of the controller.

An eighth embodiment of the present invention will be described with reference to FIG. 27 as well as FIG. 25 relating to the seventh embodiment. In FIG. 27, identical functions to those in FIG. 24 are denoted by the same reference numerals.

This eighth embodiment includes, similarly to the sixth embodiment, the pressure sensors 102*a*, 102*b* and 103*a*, 103*b* and the pressure sensor 101. Also, the storage 110 of a controller 100 comprises, similarly to the sixth embodiment, the storage sections 110*c*, 110*d* for respectively storing the relationship between the pilot pressures Pia1, Pia2 and Pib1, Pib2 and the drive signal i for the solenoid proportional valve 105 and the relationship between the delivery pressure Pd of the hydraulic pump 1 and the modification coefficient K.

Figure 25:
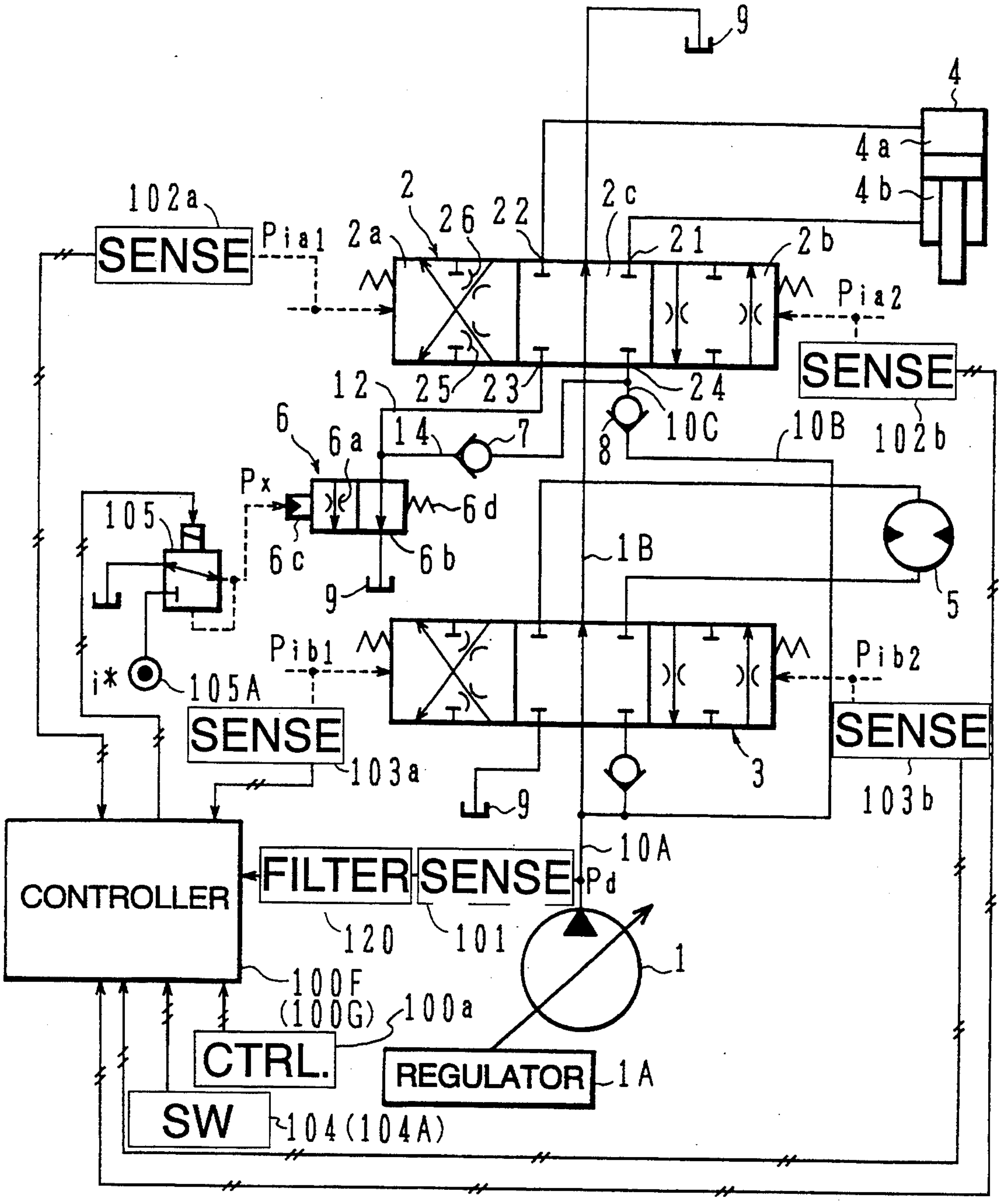
FIG. 25 is a diagram showing the entire arrangement of a hydraulic drive system equipped with a hydraulic recovery device according to a seventh embodiment of the present invention.
Figure 26:
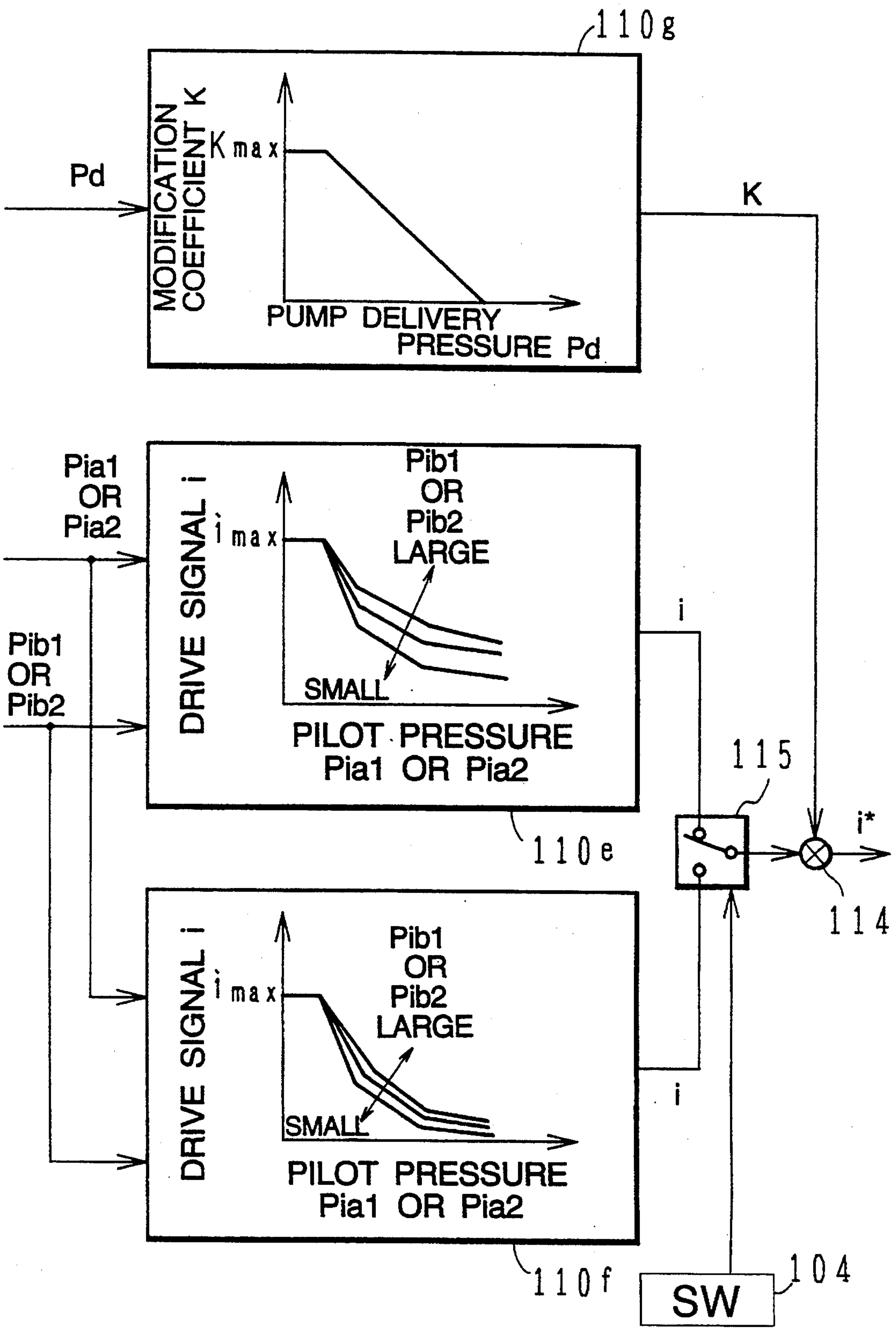
FIG. 26 is a representation showing the relationship between the pilot pressures and the drive signal and the relationship between the pump delivery pressure and a modification coefficient, which are stored in the storage of a controller in the seventh embodiment, as well as a processing function of the controller.

This seventh embodiment further includes a recovery select switch 104A, as shown in FIG. 25, and the controller 100G has, as shown in FIG. 27, the multiplying function 114 for determining the product i* of the drive signal i and the modification coefficient K and a switching function 160 for connecting or cutting the output of the drive signal i* in response to an on/off signal from the recovery select switch 104A. The remaining is of the same arrangement as the sixth embodiment.

In the eighth embodiment thus arranged, when the recovery control is not necessary, the recovery select switch 104A is turned off to bring the switching function 160 into an off-state. The hydraulic cylinder 4 is thereby driven at a low speed without any recovered flow rate. When the recovery select switch 104A is turned on, the control function 160 is brought into an on-state so that the drive signal i is output. Therefore, the recovery control can be effected as in the sixth embodiment with a resultant improvement in operability.

Consequently, this eighth embodiment can provide, in addition to the advantages of the sixth embodiment, an advantage that by canceling the recovery control in the case of desiring the hydraulic cylinder 4 to move at a speed as low as possible as encountered in the finish work for leveling of ground, the hydraulic cylinder 4 can be operated at a low speed with a resultant improvement in workability.

Ninth Embodiment

Figure 28:
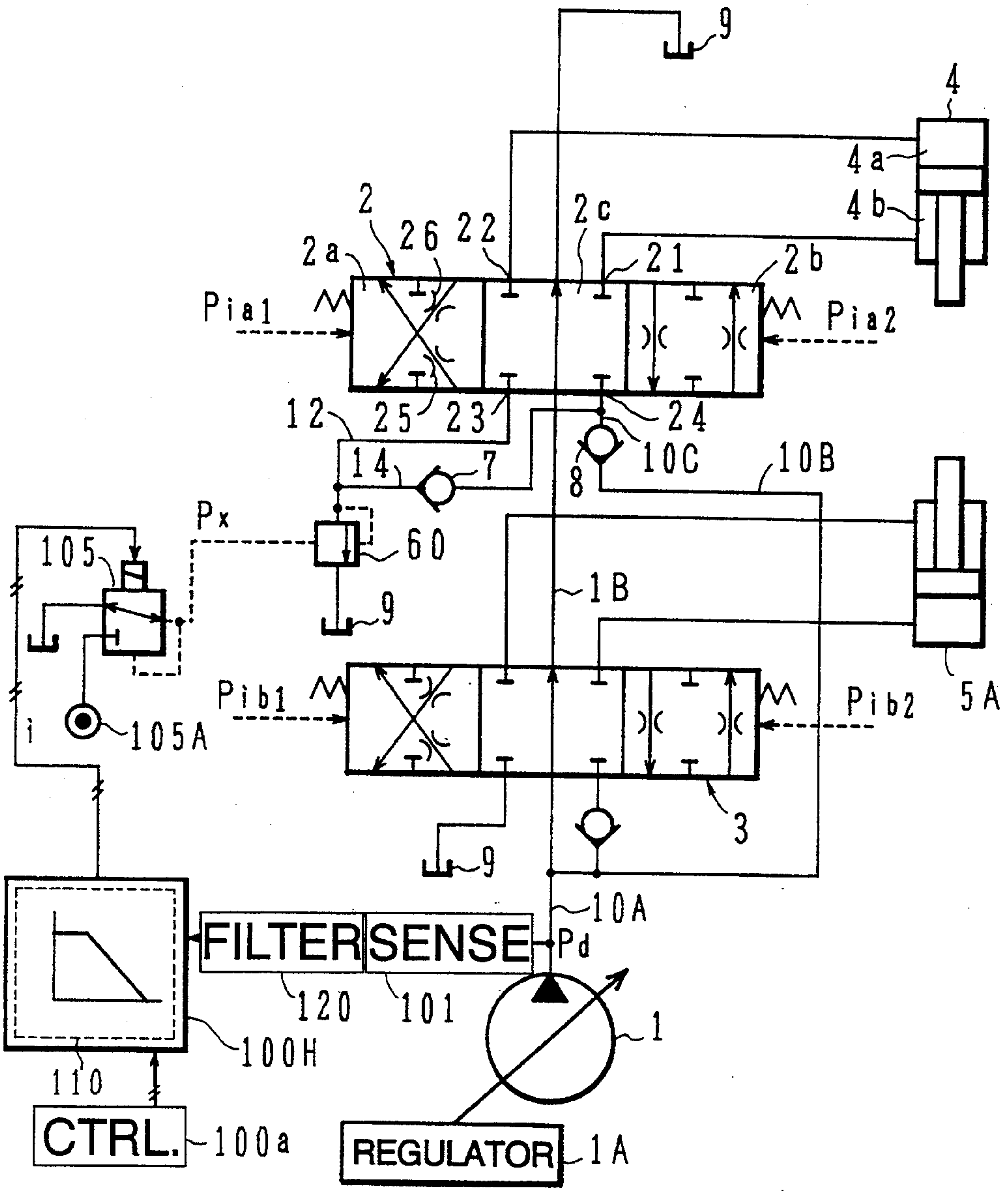
FIG. 28 is a diagram showing the entire arrangement of a hydraulic drive system equipped with a hydraulic recovery device according to a ninth embodiment of the present invention.

A ninth embodiment of the present invention will be described with reference to FIG. 28. In the figure, identical members to those in FIG. 1 are denoted by the same reference numerals.

In this ninth embodiment, the pilot type directional control valves 2, 3 are disposed respectively between the variable displacement hydraulic pump 1 and a plurality of actuators, e.g., the hydraulic cylinder 4 for an arm and a hydraulic cylinder 5 for a boom, and a variable relief valve 60 is disposed as the pressure generating means in the first line 12 connecting the directional control valve 2 and the reservoir 9. The pilot pressure Px generated by the solenoid proportional valve 105 is introduced to a setting sector of the variable relief valve 60 for adjusting a set pressure of the variable relief valve 60. The remaining is of the same arrangement as the first embodiment.

In this ninth embodiment, the set pressure of the variable relief valve 60 is changed by the pilot pressure Px from the solenoid proportional valve 105 depending on the delivery pressure Pd of the hydraulic pump 1. Therefore, when the delivery pressure Pd of the hydraulic pump 1 is low, the pilot pressure Px applied to the variable relief valve 60 becomes high to thereby increase the recovered flow rate from the first line 12 to the second line 10C. On the other hand, when the delivery pressure Pd of the hydraulic pump 1 is raised, the pilot pressure Px applied to the variable relief valve 60 is lowered to thereby reduce the recovered flow rate from the first line 12 to the second line 10C.

As with the first embodiment, this ninth embodiment can also improve operability as compared with the prior art.

INDUSTRIAL APPLICABILITY

According to the present invention, as described hereinabove, abrupt changes in the recovered flow rate can be prevented and hence operability can be improved as compared with the prior art. Also, a hunting of the recovered flow rate can be prevented and hence safety is ensured. Furthermore, since the recovered flow rate can be optionally changed, it is possible to freely set the actuator speed depending on the work to be carried out, and to improve the working efficiency.

We claim:

1. A hydraulic recovery device equipped in a hydraulic drive system comprising a plurality of actuators (4, 5) operated by a hydraulic fluid supplied from a variable displacement type hydraulic pump (1), and a plurality of directional control valves (2, 3) disposed between said hydraulic pump and said plurality of actuators for controlling respective flows of the hydraulic fluid supplied to the associated actuators, said hydraulic recovery device comprising variable resistance means (6; 60) disposed in a first line (12) communicating a reservoir port (23) of at least one (2) of said plurality of directional control valves and a reservoir (9) for controlling a flow rate passing from said reservoir port to said reservoir in accordance with a control signal (Px), a third line (14) communicating a portion of said first line upstream of said variable resistance means and a second line (10C) connected to a pump port (24) of said one directional control valve, and a check valve (7) disposed in said third line for allowing the hydraulic fluid to flow only in a direction from said first line toward said second line, wherein said hydraulic recovery device further comprises:

(a) detecting means (101; 106; **102*a*, 102*b*; 103*a*, 103*b*) for detecting a condition variable (Pd; Ph; Pia1, Pia2; Pib1, Pib2) related to an operation of said actuator (4**);

(b) control means (100; 100A–100H) for receiving a signal from said detecting means and producing a drive signal (i; i*) corresponding to said condition variable based on a relationship stored therein in advance; and (c) control signal generating means (105) for receiving said drive signal and producing said control signal (Px) corresponding to said drive signal.

2. A hydraulic recovery device according to claim 1, wherein said condition variable is a pressure (Pd; Ph) that is changed with operation of said actuator (4) associated with said directional control valve (2).

3. A hydraulic recovery device according to claim 2, wherein said relationship stored in advance sets a relationship between said pressure (Pd; Ph) and said drive signal (i) such that a change in an outflow rate through said variable resistance means (6; 60) per unit variation in said pressure (Pd; Ph) as said condition variable becomes smaller than would be the case of directly driving said variable resistance means with said pressure (Pd; Ph).

4. A hydraulic recovery device according to claim 2, wherein the pressure as said condition variable is a delivery pressure (Pd) of said hydraulic pump (1).

5. A hydraulic recovery device according to claim 2, wherein the pressure as said condition variable is a load pressure (Ph) of said actuator (4) associated with said directional control valve (2).

6. A hydraulic recovery device according to claim 1, wherein said condition variable is an operating signal (Pia1, Pia2) applied to said directional control valve (2) for instructing an operation of the associated actuator (4).

7. A hydraulic recovery device according to claim 6, wherein said relationship stored in advance sets a relationship between said operating signal (Pia1; Pia2) and said drive signal (i) such that a pressure change caused in said second line (12) by said variable resistance means (6; 60) per unit variation in said operating signal (Pia1; Pia2) as said condition variable becomes smaller than would be the case of directly driving said variable resistance means with said operating signal.

8. A hydraulic recovery device according to claim 6, wherein said directional control valve is a pilot-operated valve (2) and the operating signal as said condition variable is a pilot pressure (Pia1, Pia2) applied to said directional control valve.

9. A hydraulic recovery device according to claim 1, wherein said condition variable comprises a pressure (Pd; Ph) that is changed with an operation of said actuator (4) associated with said directional control valve (2) and an operating signal (Pia1, Pia2) applied to said directional control valve for instructing an operation of the associated actuator, and said control means (100; 100E; 100F; 100G) includes means (114) for combining said pressure and said operating signal to produce said drive signal (i*).

10. A hydraulic recovery device according to claim 1, wherein said condition variable comprises an operating signal (Pia1, Pia2) applied to said directional control valve (2) for instructing an operation of the associated actuator (4) and an operating signal (Pib1, Pib2) applied to the other directional control valve (3) for instructing an operation of the associated actuator (5), and said control means (100D–100G) includes means (114) for combining said two operating signals to produce said drive signal (i*).

11. A hydraulic recovery device according to claim 1, wherein said condition variable comprises a pressure (Pd; Ph) that is changed with an operation of said actuator (4) associated with said directional control valve (2), an operating signal (Pia1, Pia2) applied to said directional control valve for instructing an operation of the associated actuator and an operating signal (Pib1, Pib2) applied to the other directional control valve (3) for instructing an operation of the associated actuator (5), and said control means (100E–100G) includes means (114) for combining said pressure and said two operating signals to produce said drive signal.

12. A hydraulic recovery device according to claim 1, further comprising mode switch means (104) for outputting a mode signal to said control means (100F), wherein said control means (100F) includes storage means (110*e*, 110*f*) for storing, as said relationship stored in advance, a plurality of relationships between said condition variables (Pia1, Pia2, Pib1, Pib2) and said drive signal (i), and select means (115) for producing said drive signal based on one of said plurality of relationships in response to said to said mode signal.

13. A hydraulic recovery device according to claim 1, further comprising recovery select switch means (104A) for outputting a select signal to said control means (100G), wherein said control means (100G) includes switching means (106) for switching the output of said drive signal (i*) in response to said select signal.

14. A hydraulic recovery device according to claim 1, wherein said variable resistance means is valve means (6) having a variable throttle (6*a*).

15. A hydraulic recovery device according to claim 1, wherein said variable resistance means is a variable relief valve (6).

16. A hydraulic recovery device according to claim 1, wherein said control signal generating means is a solenoid proportional valve (105) for generating a pilot pressure (px).

17. A hydraulic recovery device according to claim 1, further comprising a low-pass filter (120) disposed between said detecting means (101; 106) and said control means (100; 100A; 100C; 100E–100H) for removing low-frequency components of the signal from said detecting means.

* * * * *